US012809368B2

(12) United States Patent
Gordon et al.

(10) Patent No.: US 12,809,368 B2
(45) Date of Patent: Nov. 24, 2026

(54) TRANSFERRING CONTROL OF VEHICLES BETWEEN LOCAL OPERATORS AND REMOTE TELEOPERATORS

(71) Applicant: Vay Technology GmbH, Berlin (DE)

(72) Inventors: Karsten Gordon, Ringsee (DE); Nicolai Wojke, Berlin (DE); Daniel Buchmueller, Truckee, CA (US)

(73) Assignee: Vay Technology GmbH, Berlin (DE)

( * ) Notice: Subject to any disclaimer, the term of this patent is extended or adjusted under 35 U.S.C. 154(b) by 126 days.

(21) Appl. No.: 18/352,695

(22) Filed: Jul. 14, 2023

(65) Prior Publication Data

US 2025/0021091 A1 Jan. 16, 2025

(51) Int. Cl.

| | |
|---|---|
| ***G08G 1/16*** | (2006.01) |
| ***G05D 1/00*** | (2024.01) |
| ***G08G 5/80*** | (2025.01) |
| ***G08G 7/02*** | (2006.01) |

(52) U.S. Cl.

CPC ......... *G05D 1/0022* (2013.01); *G05D 1/0038* (2013.01)

(58) Field of Classification Search

CPC .. G05D 1/0022; G05D 1/0038; G05D 1/2247; G05D 1/2279; G05D 2105/22; G05D 2107/13; G05D 2109/10

See application file for complete search history.

(56) References Cited

U.S. PATENT DOCUMENTS 11,447,154 B2 9/2022 Tarao et al.
2014/0207535 A1* 7/2014 Stefan .............. G06Q 10/06398 701/1
2018/0088571 A1* 3/2018 Weinstein-Raun .......................... G05D 1/0088
2018/0196426 A1* 7/2018 Kim ........................ B61L 27/57
2020/0282980 A1* 9/2020 Kinoshita ............ G05D 1/0027
2021/0034049 A1 2/2021 Tokuda et al.
2023/0061919 A1* 3/2023 Takashima ........... G05D 1/0011
2024/0192680 A1* 6/2024 Gupta ............ G06Q 10/063116
2024/0329647 A1* 10/2024 Masuda ................. G08G 1/205

OTHER PUBLICATIONS

International Search Report and Written Opinion for International Application No. PCT/EP2024/069918, dated Oct. 2, 2024.

* cited by examiner

*Primary Examiner* — Anne Marie Antonucci
*Assistant Examiner* — Jingli Wang
(74) *Attorney, Agent, or Firm* — Athorus, PLLC

(57) ABSTRACT

A vehicle is configured for local operation by an on-board human operator or remote operation by a remote human operator (or teleoperator) via a computer system in communication with the vehicle. A local human operator may request that a remote human operator take operational control of the vehicle, and a bi-directional communication channel between the computer system and the vehicle is established. The remote human operator is selected based on a drive state of the vehicle, any attributes of the local human operator or the remote human operator. When the vehicle violates one or more standards under operational control of the local human operator, transfer of the operational control is recommended to the local human operator. When the vehicle violates one or more standards under the operational control of a remote human operator, the operational control of the vehicle is transferred to another remote human operator.

20 Claims, 20 Drawing Sheets

SELECT TELEOPERATOR FROM POOL

PROVIDE IMAGING DATA AND DRIVE STATE TO SELECTED TELEOPERATOR

CONTROL TRANSFERRED TO
SELECTED TELEOPERATOR

CONTROL OF VEHICLE
TRANSFERRED TO TELEOPERATOR 7

TRANSFERRING CONTROL OF VEHICLES BETWEEN LOCAL OPERATORS AND REMOTE TELEOPERATORS

BACKGROUND

Traditionally, road vehicles such as automobiles, trucks or others have been operated by local operators who are riding in or on such vehicles. A local operator may typically cause a road vehicle to accelerate or brake, or to change gears or other power configurations, by contact with one or more foot pedals provided within the road vehicle. A local operator may also cause a road vehicle to travel on a desired course or in a desired direction, or to change a course or a direction, by interacting with a steering wheel or another control system provided within the road vehicle. Alternatively, a local operator may also choose routes for a road vehicle, establish environmental conditions within the road vehicle, or otherwise take any other actions with respect to the operation of the road vehicle, by interacting with one or more systems provided within the road vehicle.

The use of a teleoperator to remotely drive a road vehicle may be considered a transient technology between local operation of road vehicles and fully autonomous operation of road vehicles. In remote driving applications, a teleoperator may use a teleoperator station to remotely control any or all aspects of the operation of the vehicle by distributing commands or instructions to the road vehicle via a wireless communication network. A teleoperator may remotely operate a road vehicle in any manner, such as by viewing a live video stream representing one or more views of the vehicle's environment at the teleoperator station, and executing one or more commands or instructions to cause the road vehicle to travel on a course or to travel at a speed, or to change a course or a speed of the road vehicle, using one or more computer devices or other components.

Transferring control of a road vehicle from a local operator to a remote operator, e.g., a teleoperator, or from the remote operator to the local operator, is a critical evolution that must be executed precisely and effectively, in order to ensure that the road vehicle is safely operated without risk to any occupants of the road vehicle, or of any persons, property or other road vehicles within a vicinity of the road vehicle.

DETAILED DESCRIPTION

Figure 1:
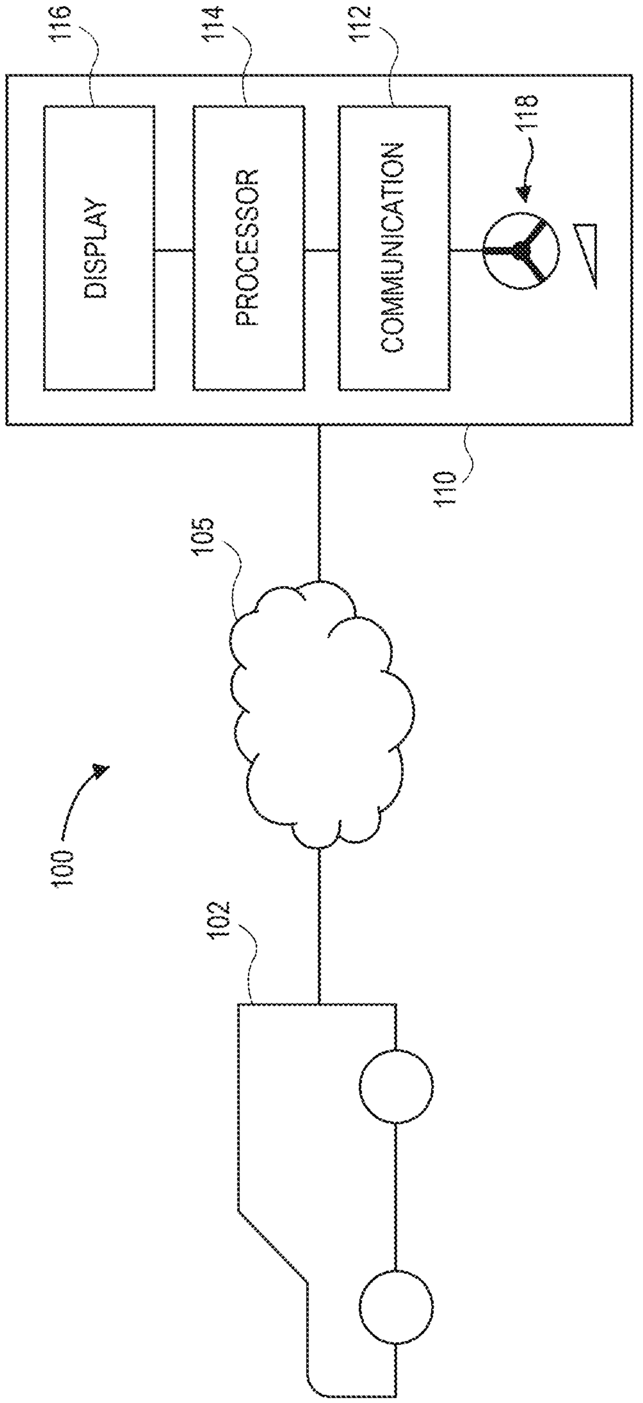
FIG. 1 is a view of aspects of one remote driving system in accordance with implementations of the present disclosure.

As is set forth in greater detail below, the present disclosure is directed to systems and methods for transferring control of vehicles (e.g., road vehicles) between local operators, or drivers, and remote operators, or teleoperators.

In some implementations, a driver may request to transfer control of a vehicle from himself or herself to a remote operator, or a teleoperator, in any manner and on any basis. For example, in some implementations, a driver may contact or otherwise interact with one or more buttons, switches or other controls, which may be or include discrete physical components or representations on a display (e.g., a touchscreen). Upon receiving an interaction with one or more of such controls, the vehicle may transmit one or more signals or other sets of information or data to one or more servers or other computer devices or systems, along with any relevant information or data regarding the operator and a drive state of the vehicle. The information or data may be received by the servers or other devices or systems and processed, and a teleoperator may be selected to operate the vehicle based on the attributes of the operator or the drive state of the vehicle accordingly.

Once a teleoperator has been selected to remotely operate a vehicle within an environment, the teleoperator may use a teleoperator station to generate one or more commands or instructions for driving the vehicle, and transmit such commands or instructions to the vehicle via a wireless communication network. Imaging devices or sensors associated with the vehicle may capture live streams of data, e.g., video data, representing views of the vehicle's environment or attributes of a drive state of the vehicle. The streams of data may then be transmitted, processed, and presented to the teleoperator at the teleoperator station. At the teleoperator station, the teleoperator may view at least a portion of the data, such as one or more live video streams, and remotely operate the vehicle by way of a control interface or other control system to generate drive control commands or instructions. The teleoperator station may then process and transmit the drive control commands or instructions to the vehicle, which may receive, process, and execute such commands or instructions. Streams of data received from the vehicle may be processed and presented to account for latency or any other factors, or for any other reason.

In some implementations, a pool of teleoperators, or information or data regarding such teleoperators, may be maintained and utilized to select one of the teleoperators to remotely operate a vehicle upon a request received from a driver. For example, the pool may identify each of the teleoperators, as well as relevant information or data regarding their respective levels of experience in remotely operating vehicles. Such information or data may be general or specific in nature, and may indicate any relevant experience that teleoperators in the pool have associated with remotely operating vehicles in general, or may specifically relate to experience of such teleoperators with vehicles or drivers from which requests are received, or experience in locations, conditions or situations in which such requests are received.

In some implementations, after control of a vehicle has been transferred from a driver to a teleoperator, operations of the vehicle may be monitored to determine whether the teleoperator is operating the vehicle to a level of satisfaction of the driver, or in accordance with a predetermined set of standards. For example, whether the teleoperator has caused the vehicle to operate in accordance with an established speed limit or posted signage, e.g., bearing instructions to stop or proceed with caution, or whether the teleoperator has generally operated the vehicle in a safe manner or in accordance with expectations or preferences of the customer may be determined. If the teleoperator has not operated the vehicle to a level of satisfaction of the driver, or in accordance with any number of standards, the driver may be prompted to resume operating the vehicle locally, or the remote operation of the vehicle may be assigned to another teleoperator.

In some implementations, when a driver is locally operating a vehicle, a recommendation that the driver transfer control of the vehicle to one or more teleoperators may be generated where the operation of the vehicle has violated one or more rules or requirements, or is at risk of violating one or more of the rules or requirements. For example, where a driver has maintained local control over a vehicle for an extended duration without a break, or where a driver has violated one or more posted speed limits, veered into or out of lanes unnecessarily, or otherwise locally operated the vehicle in a manner that is potentially unsafe or renders the driver at risk of violating one or more rules or requirements, a message, a signal or another set of information or data including or representing a recommendation to transfer control of the vehicle from the driver to a teleoperator may be provided to the driver. Alternatively, where the vehicle is approaching a location or an environment where traffic or weather conditions are extraordinarily challenging, a location or an environment that is unfamiliar to the driver, or a location or an environment that is not ordinarily preferred by or driven on or through by the driver, a message, a signal or another set of information or data including or representing a recommendation to transfer control of the vehicle to a teleoperator may be provided to the driver.

Conversely, in some implementations, where a teleoperator is remotely operating a vehicle, a message, a signal or another set of information or data including or representing a recommendation that the driver take over control of the vehicle from a teleoperator may be generated where the remote operation is challenged by connectivity or equipment issues, or for any other reason. For example, where a vehicle is incapable of operating in accordance with one or more sets of commands or instructions, or is not timely responding to such commands or instructions, a message, a signal or another set of information or data including or representing a recommendation to transfer control of the vehicle from the teleoperator to the driver may be provided to the driver.

Referring to FIG. 1, a view of aspects of one remote driving system 100 in accordance with implementations of the present disclosure is shown.

As shown in FIG. 1, the remote driving system 100 may comprise a vehicle 102 that is constructed or adapted to be remotely driven, controlled, or instructed by a teleoperator via a wireless communication network 105. In addition, the remote driving system 100 of FIG. 1 may comprise a teleoperator station 110 for use by a teleoperator to generate one or more commands or instructions for remotely driving, controlling, or instructing the vehicle 102 via the wireless communication network 105.

In some implementations, the vehicle 102 may comprise a car, such as a small car (e.g., a compact), a regular car (e.g., a sedan), a Sport Utility Vehicle ("SUV"), a van, a truck, or any other type of vehicle 102 that is constructed or adapted to be remotely driven, controlled, or instructed. In addition, the vehicle 102 may comprise a modified vehicle 102 that includes or provides any required on-board infrastructure for teleoperation. For example, the vehicle 102 may include one or more actuators for controlling the vehicle 102, one or more imaging devices, cameras, or sensors for capturing imaging data of the vehicle 102's environment, one or more sensors to detect or measure drive state information, and/or various interfaces for bi-directional communication with the teleoperator station 110 via the wireless communication network 105.

Actuators for controlling the vehicle 102 may include mechanical actuators that directly actuate a steering wheel, acceleration pedal, brakes, and/or other systems or components of the vehicle 102. Alternatively, actuators for controlling the vehicle 102 (e.g., for adjusting or controlling speed, acceleration, steering angle, and/or other operational characteristics) may be controlled via an electronic interface associated with the vehicle 102.

Imaging devices or cameras associated with the vehicle 102 may include various types of imaging sensors, analog cameras, digital cameras, video cameras, depth sensors, infrared sensors, time-of-flight sensors, or other types of imaging sensors. The imaging devices or cameras may be mounted or installed and oriented at various positions on the vehicle 102 in order to capture imaging data of an environment at least partially surrounding the vehicle 102, e.g., in a forward movement direction, in a rearward movement direction, and/or in various other directions of a periphery of the vehicle 102. In addition, the imaging devices or cameras May capture imaging data, such as video data, live video streams, or other types of imaging data, which may be transmitted to the teleoperator station 110 and used for any purpose, such as to facilitate generation of a visualization of the vehicle 102 within the imaging data.

Sensors for detecting or measuring drive state information of the vehicle 102 may include not only imaging devices or cameras but also various other types of sensors configured for detecting speed, acceleration, steering angle, and/or other operational characteristics of the vehicle 102. For example, a first sensor such as a speedometer or encoder may measure a drive speed of the vehicle 102, while a second sensor such as an accelerometer, a pressure sensor, or an encoder may measure pedal actuation, acceleration, deceleration, or braking of the vehicle 102, and a third sensor such as an encoder or position or orientation sensor may measure a steering state or angle of the steering wheel, or an orientation of wheels of the vehicle 102. Drive state information of the vehicle 102 may be transmitted to the teleoperator station 110, or to any other computer devices or systems (e.g., a server), and may be used to facilitate generation of a visualization of the vehicle 102 within the imaging data, or for any other purpose, as further described herein.

Interfaces for bi-directional communication between the vehicle 102 and the teleoperator station 110 may enable transmission of imaging data, drive state information associated with the vehicle 102, or any other information or data from the vehicle 102 to the teleoperator station 110 via the wireless communication network 105. In addition, the interfaces for bi-directional communication with the teleoperator station 110 may enable receipt of drive control commands and/or other data, information, commands, or instructions from the teleoperator station 110 via the wireless communication network 105.

In some implementations, the wireless communication network 105 may include a network that allows for bi-directional transmission of data between the vehicle 102 and the teleoperator station 110. For example, the network 105 may be a Long Term Evolution (or "LTE") network, a fourth generation (4G) wireless communication network, a fifth generation (5G) wireless communication network, or any other types of wireless communication networks. The network 105 may also include the Internet, in whole or in part.

Various information or data may be transmitted via the network 105, including but not limited to imaging data and/or drive state information associated with the vehicle 102, e.g., from the vehicle 102 to the teleoperator station 110, as well as drive control commands or instructions, or other data, information, commands, or instructions, e.g., from the teleoperator station 110 to the vehicle 102. Drive state information may comprise data or information related to speed, acceleration, steering angle, and/or other operational data or characteristics associated with the vehicle 102. Further, additional data may be exchanged between the vehicle 102 and the teleoperator station 110, such as time synchronization information including data transmission timestamps, or between the vehicle 102 or the teleoperator station 110 and any other computer devices or systems.

In some implementations, the teleoperator station 110 may comprise a communication unit 112 configured to send and receive data or information to and from the vehicle 102 via the network 105, as well as a processor (or processing unit) 114 configured to process various data and generate a visualization of a vehicle 102 to account for video latency as further described herein, a presentation (or display) device 116 configured to present the imaging data and the visualization of the vehicle 102 to a teleoperator using the teleoperator station 110, and a control interface 118 configured to receive drive control commands from the teleoperator using the teleoperator station 110.

The communication unit 112 may comprise various types of communication systems, devices, antenna, interfaces, or other data transmit/receive units configured to enable wireless communication between the teleoperator station 110 and the vehicle 102 via the wireless communication network 105. As described herein, the communication unit 112 may receive imaging data, drive state information, and/or other data from the vehicle 102, and may transmit drive control commands and/or other data to the vehicle 102.

As further described herein, the capture, transmission, receipt, processing, and/or presentation of imaging data, e.g., video data or live video streams, or drive state information from a vehicle 102 to a teleoperator station 110 via a network 105 may introduce time delay or latency, e.g., video latency. As a result, imaging data or other information or data that is presented to a teleoperator at a teleoperator station 110 may not actually be live or real-time, but instead may be associated with a past time, based on a current value or amount of latency. In addition, the receipt, transmission, processing, and/or execution of drive control commands from a teleoperator station 110 to a vehicle 102 via a network 105 may also introduce time delay or latency, e.g., control latency. As a result, drive control commands or instructions that are sent to the vehicle 102 may actually be executed at a future time based on a current value or amount of control latency.

The processor 114 may include or be a processing unit, graphics processing unit, or another type of processors configured to process various information or data that is received and/or sent between the vehicle 102 and teleoperator station 110 via the network 105. For example, the processor 114 may receive imaging data, e.g., video data or live video streams, and determine a value or amount of video latency associated with the imaging data. In some examples, timestamps may be embedded within portions of the imaging data, e.g., as various embedded codes within one or more pixels, and the processor 114 may extract and decode the embedded timestamps to determine a current value or amount of video latency based on a comparison with a current time.

In other examples, timestamps may be sent together or along with imaging data, e.g., in metadata or other portions of the imaging data, and the processor 114 may receive or detect the timestamps to determine a current value or amount of video latency based on a comparison with a current time. Various other methods may be used to provide timestamps associated with portions of imaging data, in order to determine a current value or amount of video latency. As further described herein, the processor 114 may generate a visualization of the vehicle 102 within the imaging data based at least in part on a determined value or amount of video latency.

The processor 114 may also receive drive state information associated with the vehicle 102. For example, the drive state information may comprise data or information related to current speed, acceleration, steering angle, and/or other operational data or characteristics associated with the vehicle 102, and the processor 114 may generate a visualization of the vehicle 102 within the imaging data based at least in part on the drive state information, as further described herein. In addition, the processor 114 may receive and process drive control commands received from a teleoperator associated with the teleoperator station 110, such that the drive control commands can be transmitted to the vehicle 102 via the network 105 in order to remotely drive, control, or instruct various systems or components of the vehicle 102.

In some implementations, in order to generate a visualization of the vehicle 102 within the imaging data, the processor 114 may determine a position of the vehicle 102, e.g., an estimated position, based on the video latency and/or the drive state information. For example, based on the amount of time that has elapsed since capture of the imaging data based on the video latency, and/or based on the drive state information, e.g., speed, acceleration, and/or steering angle, associated with the time of capture of the imaging data, an estimated position of the vehicle 102 may be determined.

For example, if the vehicle 102 is traveling along a straight path at a relatively slower speed and if the video latency is a relatively small value, a position of the visualization of the vehicle 102 within the imaging data may be determined to be relatively closer to a viewpoint or perspective associated with the imaging data. In another example, if the vehicle 102 is traveling along a straight path at a relatively faster speed and if the video latency is a relatively large value, a position of the visualization of the vehicle 102 within the imaging data may be determined to be relatively farther forward from a viewpoint or perspective associated with the imaging data.

In some implementations, one or more characteristics of the visualization of the vehicle 102 may be modified based on the video latency. As an example, if the video latency is a relatively large value, the visualization of the vehicle 102 may change colors, e.g., from green to amber and/or red. In addition, highlighting, outlining, sharpness, focus, or resolution of the visualization of the vehicle 102 may be reduced or made fuzzy to indicate a relatively large value of video latency. In another example, if the video latency is a relatively small value, the visualization of the vehicle 102 may change colors, e.g., from red and/or amber to green. In addition, highlighting, outlining, sharpness, focus, or resolution of the visualization of the vehicle 102 may be increased or made clear and distinctive to indicate a relatively small value of video latency.

In some implementations, the processor 114 may determine an uncertainty associated with the determined position, e.g., based on the video latency and/or the drive state information. For example, based on the determined uncertainty associated with the determined position, various characteristics of the visualization of the vehicle 102 may be modified. In some examples, if the vehicle 102 is making a turn and if the video latency is a relatively large value such that the uncertainty associated with the position of the visualization of the vehicle 102 is relatively high, a size, bounding box, or maximum envelope associated with the visualization of the vehicle 102 may be increased or enlarged to indicate the level of uncertainty associated with the determined position. In addition or alternatively, a sharpness, focus, or resolution associated with the visualization of the vehicle 102 may be reduced or made fuzzy to indicate the level of uncertainty associated with the determined position.

In other examples, if the vehicle 102 is moving along a relatively straight path and if the video latency is a relatively small value such that the uncertainty associated with the position of the visualization of the vehicle 102 is relatively small, a size, bounding box, or maximum envelope associated with the visualization of the vehicle 102 may be decreased or reduced to indicate the level of uncertainty associated with the determined position. In addition or alternatively, a sharpness, focus, or resolution associated with the visualization of the vehicle 102 may be increased or made clear or distinctive to indicate the level of uncertainty associated with the determined position.

The presentation device 116 may comprise one or more monitors, screens, projectors, display devices, head-mounted displays, augmented reality displays, and/or other types of presentation devices. For example, the presentation device 116 may receive and present, render, or display the imaging data, e.g., video data or live video streams, received from the vehicle 102. In addition, the presentation device 116 may receive the visualization of the vehicle 102 generated by the processor 114, and may present, render, or overlay the visualization of the vehicle 102 within or onto the imaging data. The presentation device 116 may present the imaging data and the visualization of the vehicle 102, such that a teleoperator at the teleoperator station 110 may perceive and understand an environment around the vehicle 102 and safely and reliably drive, control, or instruct operations of the vehicle 102.

The control interface 118 may comprise a steering wheel, acceleration pedal, brake pedal, transmission selector, and/or various other interface components to generate drive control commands for the vehicle 102. In addition, the control interface 118 may include components, elements, or interfaces to control or instruct various other aspects of the vehicle 102, such as lights, turning indicators, windshield wipers, power windows, power doors, climate control systems, entertainment or infotainment systems, and/or various other systems, devices, or accessories associated with the vehicle 102. The control interface 118 may receive drive control commands provided or input by a teleoperator at the teleoperator station 110, which may then be processed and/or transmitted to the vehicle 102 via the network 105.

Although FIG. 1 illustrates an example remote driving system 100 having a particular number, type, configuration, and arrangement of various components, other implementations may include various other numbers, types, configurations, and arrangements of the various components. For example, one or more vehicles 102 may be in communication with one or more teleoperator stations, various types of wireless communication networks may be used to facilitate communication between vehicles 102 and teleoperator stations, and/or various other modifications may be made in other implementations of the remote driving system 100.

Referring to FIGS. 2A through 2H, views of aspects of one system 200 for transferring control of vehicles in accordance with implementations of the present disclosure are shown. Except where otherwise noted, reference numerals preceded by the number "2" shown in FIGS. 2A through 2H indicate components or features that are similar to components or features having reference numerals preceded by the number "1" shown in FIG. 1.

Figure 2A:
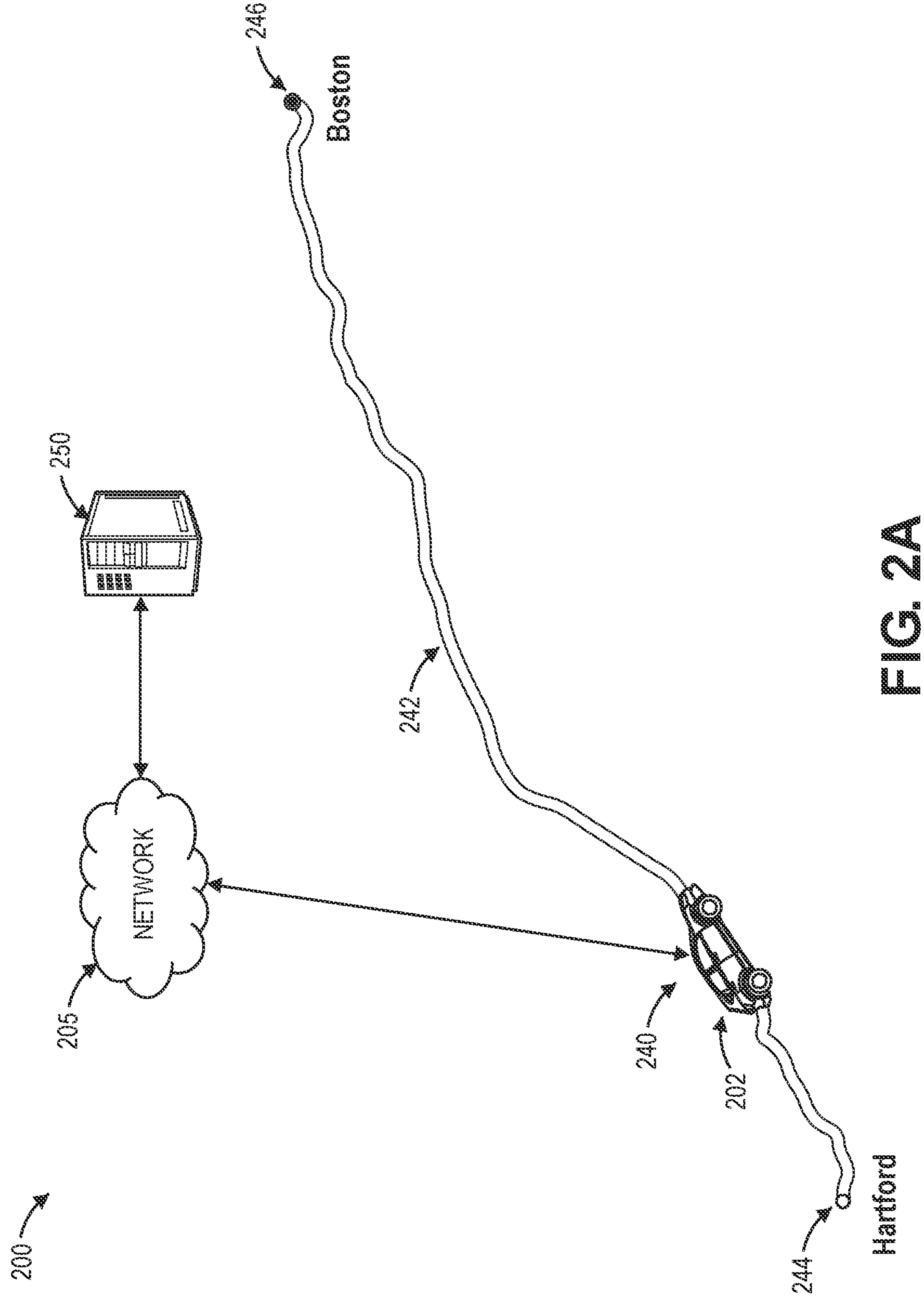
FIGS. 2A through 2H are views of aspects of one system for transferring control of vehicles in accordance with implementations of the present disclosure.

As is shown in FIG. 2A, a vehicle 202 travels along a route 242 from an origin 244 (viz., Hartford, Connecticut) to a destination 246 (viz., Boston, Massachusetts), under the operational control of a driver 240. The vehicle 202 may be an automobile of any type or form, e.g., a convertible, a coupe, a hatch back, a sedan, a sport-utility vehicle, a truck, a van, or any other type or form of car. The route 242 may include any number of roads of any capacity or rating, which may include lane widths of typically nine to twelve feet each, and surfaces formed from standard materials such as asphalt, concrete, cement, gravel, cobblestone or dirt, or any other suitable materials. For example, the route 242 may include roads such as highways (e.g., interstate highways, divided highways, or undivided highways), streets, or avenues, as well as any connecting infrastructure between such roads, and may be open to traffic of all types or forms, or limited to certain types or forms of traffic, e.g., personal vehicles, such as the vehicle 202.

The vehicle 202 may include one or more onboard computer devices or systems having transceivers or other components that are in communication with at least one external computer system 250 over one or more wireless communications networks 205, which may include the Internet in whole or in part.

The vehicle 202 may also be outfitted or equipped for both local operation by a driver, e.g., the driver 240, or remote operation by one or more teleoperators (or teledrivers). For example, the vehicle 202 may include a steering wheel and one or more pedals, e.g., an accelerator and a brake pedal, as well as any number of other controllers or components for local operation by a driver. The vehicle 202 may also include any number actuators for remotely operating the vehicle, as well as one or more imaging devices, cameras, or other sensors for capturing imaging data from an environment of the vehicle, one or more sensors to detect or measure drive state information of the vehicle, or one or more interfaces for bi-directional communication between the vehicle and the computer system 250 or one or more teleoperator stations or other systems.

Figure 2B:
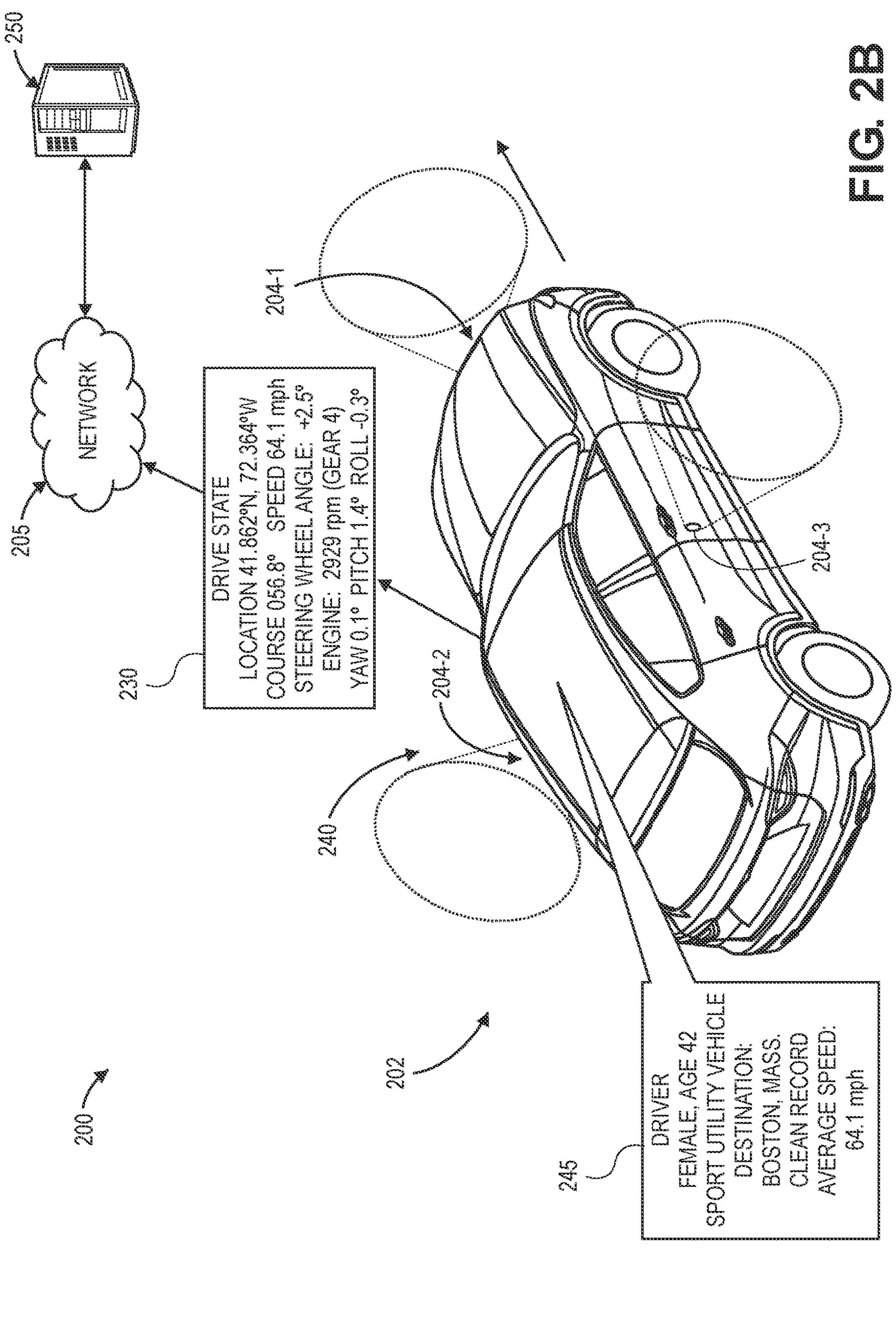

As is shown in FIG. 2B, the vehicle 202 may be outfitted with a plurality of sensors, and configured to transmit information or data captured by such sensors to the computer system 250 or any other computer devices or systems over the one or more wireless communication networks 205. For example, as is shown in FIG. 2B, the vehicle 202 may be equipped with imaging devices 204-1, 204-2, 204-3 (e.g., cameras) that are aligned to capture imaging data, e.g., visual images, depth images, or other imaging data, from fields of view surrounding the vehicle 202. The imaging device 204-1 is aligned to capture imaging data from a field of view extending forward of the vehicle 202, while the imaging device 204-2 is aligned to capture imaging data from a field of view extending from a left side (e.g., a port side) of the vehicle 202, and the imaging device 204-3 is aligned to capture imaging data from a field of view extending from a right side (e.g., a starboard side) of the vehicle 202.

The vehicle 202 may further include any other type or form of sensors, including but not limited to a position sensor (e.g., a Global Positioning System or "GPS" receiver), an inertial measurement unit (or "IMU") including one or more accelerometers, gyroscopes, compasses or position sensors, or any other sensors for determining positions, velocities, accelerations, or orientations along or about one or more principal axes of the vehicle 202. The vehicle 202 may further include any number of other sensors for determining attributes or statuses of one or more components provided aboard the vehicle 202, such as a steering angle or wheel orientation of the vehicle 202.

As is further shown in FIG. 2B, the vehicle 202 may transmit information or data regarding a drive state 230 of the vehicle 202 to the computer system 250 over the one or more wireless communication networks 205. The drive state 230 may identify a position (e.g., a latitude and longitude) of the vehicle 202, a course and a speed of the vehicle 202, a steering wheel angle of the vehicle 202, a rotational speed and/or gear of an engine of the vehicle 202, as well as a yaw angle, a pitch angle and a roll angle of the vehicle 202. Alternatively, the drive state 230 may include any other information or data regarding the operations of the vehicle 202, e.g., an estimated amount of fuel remaining, an estimated time until additional fuel is required, or the like.

Additionally, the vehicle 202 may also transmit information or data regarding attributes 245 of the driver 240 to the computer system 250 over the one or more wireless communication networks 205. For example, as is shown in FIG. 2B, the vehicle 202 may transmit an age and/or a gender of the driver 240, an identifier of the vehicle 202, the destination 246 of the driver 240, as well as information or data regarding a driving record of the driver 240, or an average speed of the driver 240, which may be calculated on a historical basis or in any other manner.

Information or data regarding the drive state 230 or the attributes 245 of the driver 240 may be transmitted to the computer system 250 or any other computer devices or systems over the one or more wireless communication networks 205 at any rate or frequency in accordance with implementations of the present disclosure. For example, in some implementations, such information or data may be transmitted at a frequency of ten hertz (or ten times per second), one hundred hertz (or one hundred times per second), or at any other rate or frequency. Alternatively, in some implementations, different information or data regarding the drive state 230 or the attributes 245 may be transmitted at different rates or frequencies. For example, in some implementations, information or data such as positions, velocities, accelerations, steering wheel angles, or Eulerian angles may be transmitted as the information or data is calculated or determined. Other information or data, such as attributes 245 of the driver 240, may be transmitted as the information or data changes, or after a predetermined period or interval of time.

Figure 2C:
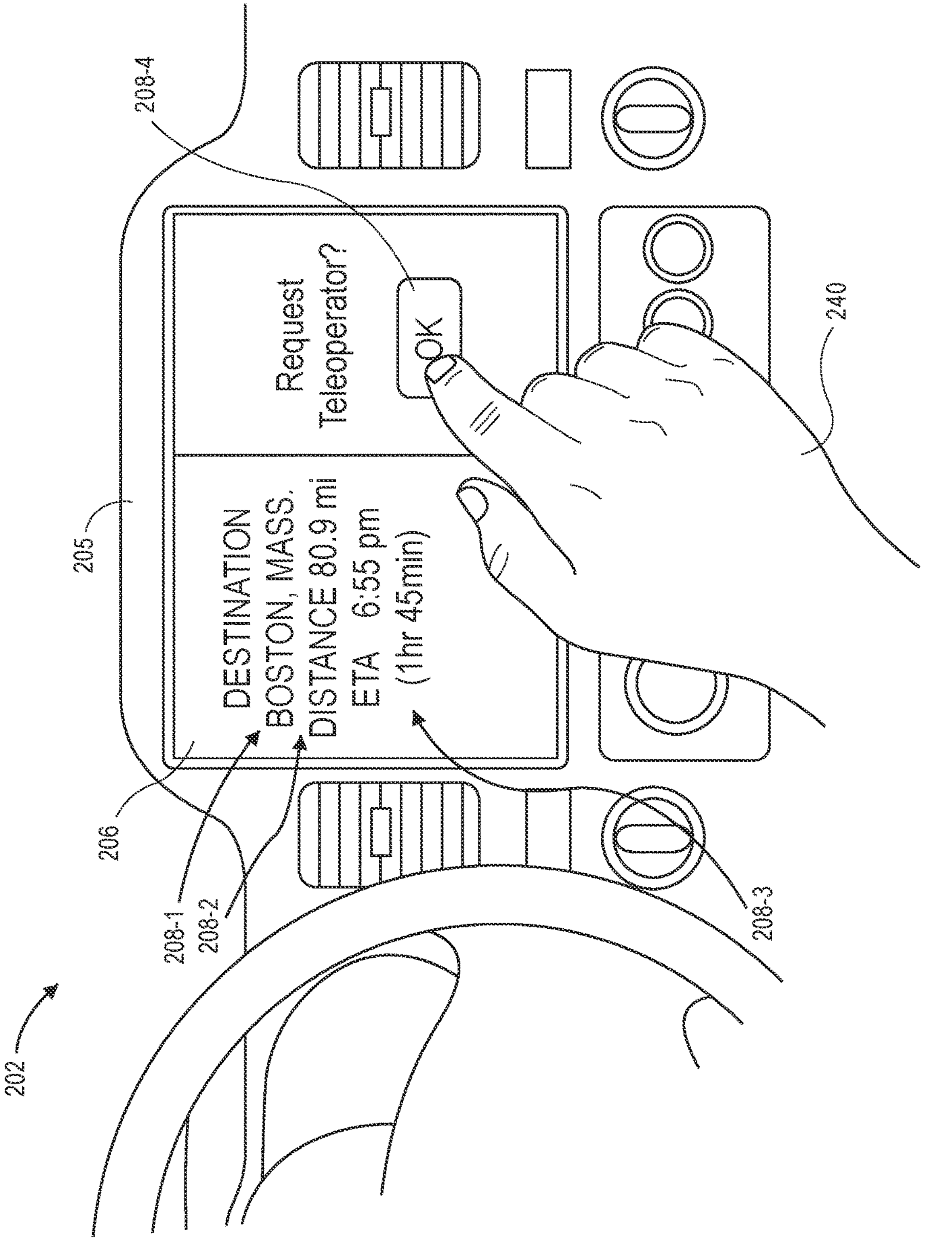

As is shown in FIG. 2C, the vehicle 202 may further include a display 205 (e.g., a touchscreen display) including a user interface 206 shown thereon. The user interface 206 may include information or data regarding the driver 240 or the vehicle 202, including but not limited to an identifier 208-1 of the destination 246, a distance 208-2 to the destination 246, and an estimated time 208-3 at which the vehicle 202 is expected to arrive at the destination 246.

Additionally, as is also shown in FIG. 2C, the user interface 206 may include a button 208-4 or another interactive feature that the driver 240 may contact in order to request that a teleoperator take over operational control of the vehicle 202 at any time. Alternatively, or additionally, the driver 240 may request that a teleoperator take over operational control of the vehicle 202 in any other manner. For example, in some implementations, the vehicle 202 may further include one or more microphones or other acoustic sensors (not shown). The driver 240 may directly request that a teleoperator take over operational control of the vehicle 202 by one or more utterances, such as "please take over operational control of my vehicle." Such microphones or other sensors may capture acoustic data representing the utterances, interpret the acoustic data as including an express request for a takeover of operational control, and transmit information or data representing the request to the computer system 250 over the one or more wireless communication networks 205. In some implementations, the driver 240 may also provide one or more utterances such as "I'm tired," "this traffic is unbearable" or "I'm lost," and acoustic data representing such utterances may be interpreted to include implicit requests for takeovers of operational control, or at least an interest of the driver 240 in a takeover of operational control, and prompt the driver 240 to confirm (e.g., audibly or by manual contact with one or more buttons or other interactive features) whether the driver 240 desires a takeover of operational control by a teleoperator.

Figure 2D:
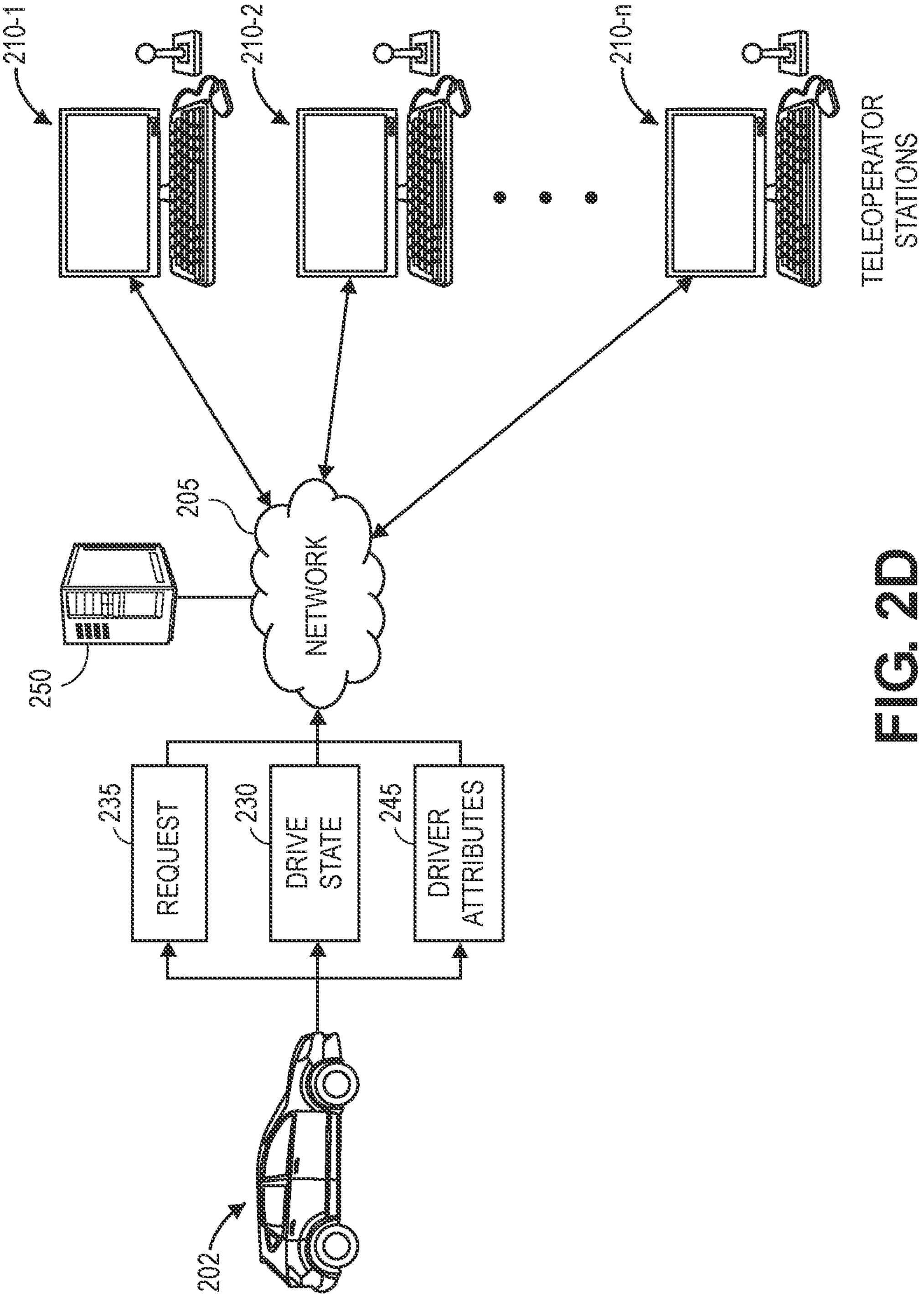

As is shown in FIG. 2D, upon receiving an interaction with the button 208-4, the vehicle 202 may transmit information or data regarding a request 235 by the driver 240 that a teleoperator take over operational control of the vehicle 202, as well as information or data regarding the drive state 230 of the vehicle 202 at a time of the request 235, and information or data regarding attributes 245 of the driver 240 at the time of the request 235, to the computer system 250 over the one or more wireless communication networks 205.

The vehicle 202 may transmit the information or data regarding the request 235, the drive state 230 or the attributes 245 of the driver 240 in individual sets (e.g., packets) of data, or stream the information or data from the vehicle 202 in a continuous or substantially continuous manner. Alternatively, or additionally, some or all of the information or data regarding the request 235, the drive state 230 or the attributes 245 of the driver 240 may also be transmitted to one or more teleoperator stations 210-1, 210-2 . . . **210-*n***, each of which may be associated with a teleoperator.

Figure 2E:
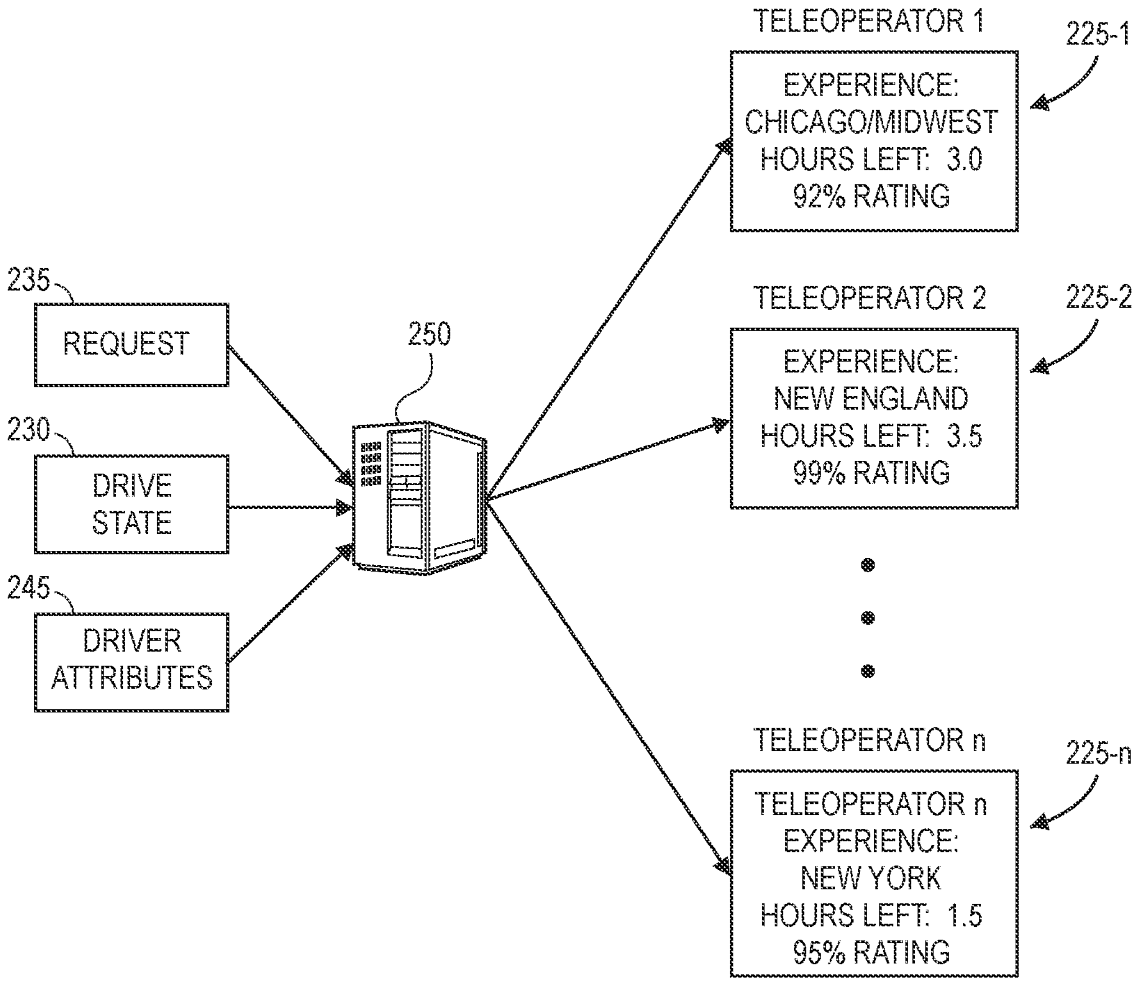

As is shown in FIG. 2E, upon receiving the information or data regarding the request 235, the drive state 230 or the attributes 245 of the driver 240, the computer system 250 may compare the information or data to information or data 225-1, 225-2 . . . **225-*n* regarding a pool of teleoperators. The information or data 225-1, 225-2 . . . 225-*n* may include any relevant attributes of the respective teleoperators, such as their respective experience in one or more locations, as well as time remaining in a current shift or availability for teleoperation, and any ratings of the teleoperators by drivers (or passengers or other teleoperators). Alternatively, the information or data 225-1, 225-2 . . . 225-*n* may include any other relevant attributes of the teleoperators or their respective teleoperator stations 210-1, 210-2 . . . 210-*n*, e.g., a level of connectivity with the one or more wireless communications networks 205, a measure of compatibility with one or more vehicles or classes of vehicles, or the like. Based on a comparison of the information or data regarding the request 235, the drive state 230 or the attributes 245 of the driver 240, and the information or data 225-1, 225-2 . . . 225-*n* regarding the teleoperators of the pool, one of the teleoperators may be selected either automatically or, in some implementations, by the driver 240**.

Figure 2F:
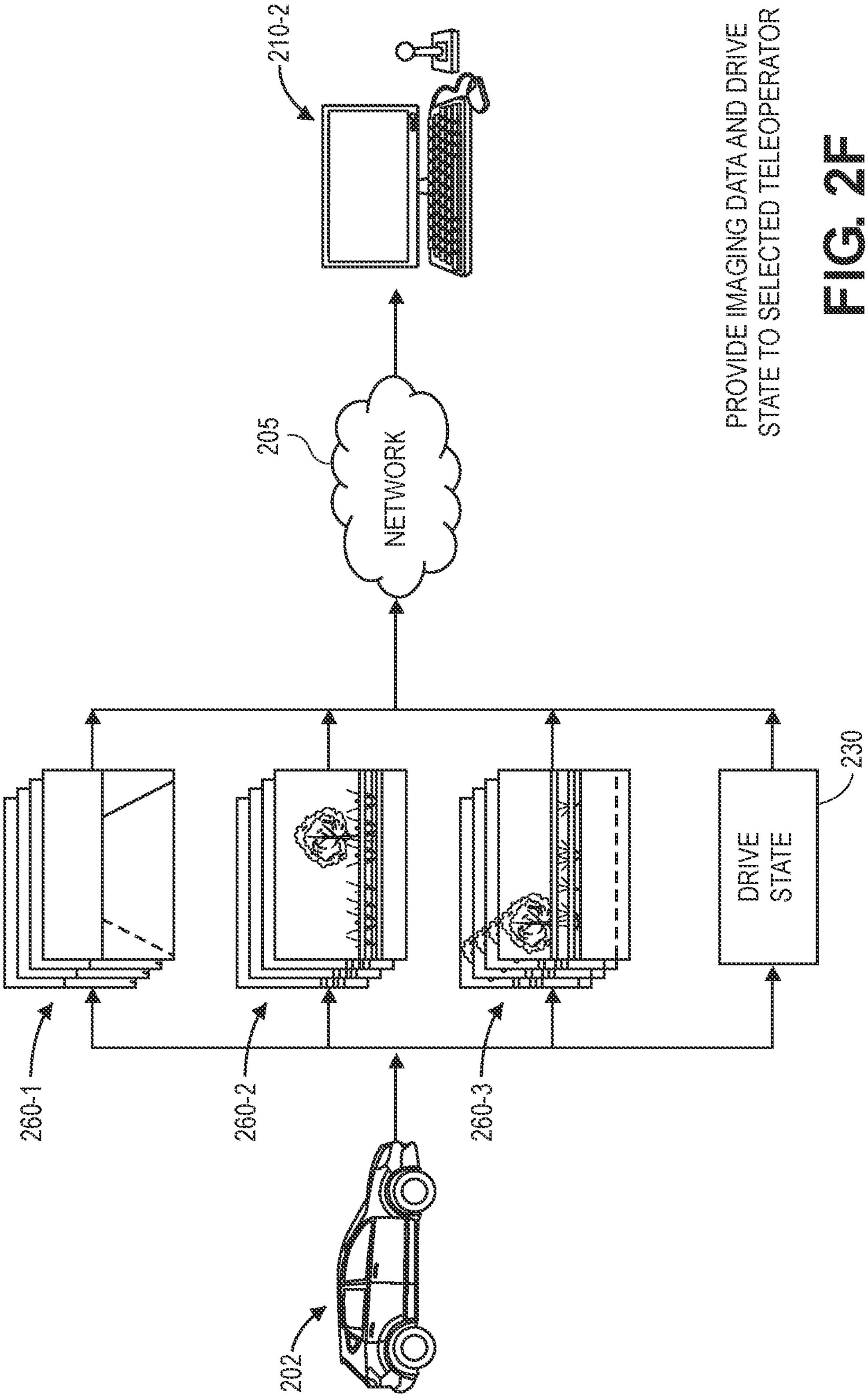

As is shown in FIG. 2F, after one of the teleoperators of the pool has been selected, a channel for bi-directional communication may be established between a teleoperator station 210-2 of the selected teleoperator and the vehicle 202, and information or data regarding the operation of the vehicle 202 may be streamed to the teleoperator station 210-2. Such information may include imaging data 260-1, 260-2, 260-3 (e.g., visual images, depth images or any other type or form of images) captured by the imaging devices 204-1, 204-2, 204-3 of the vehicle 202 shown in FIG. 2B, as well as information or data regarding the drive state 230 of the vehicle 202, which may include any information or data captured by any other sensors of the vehicle 202.

Figure 2G:
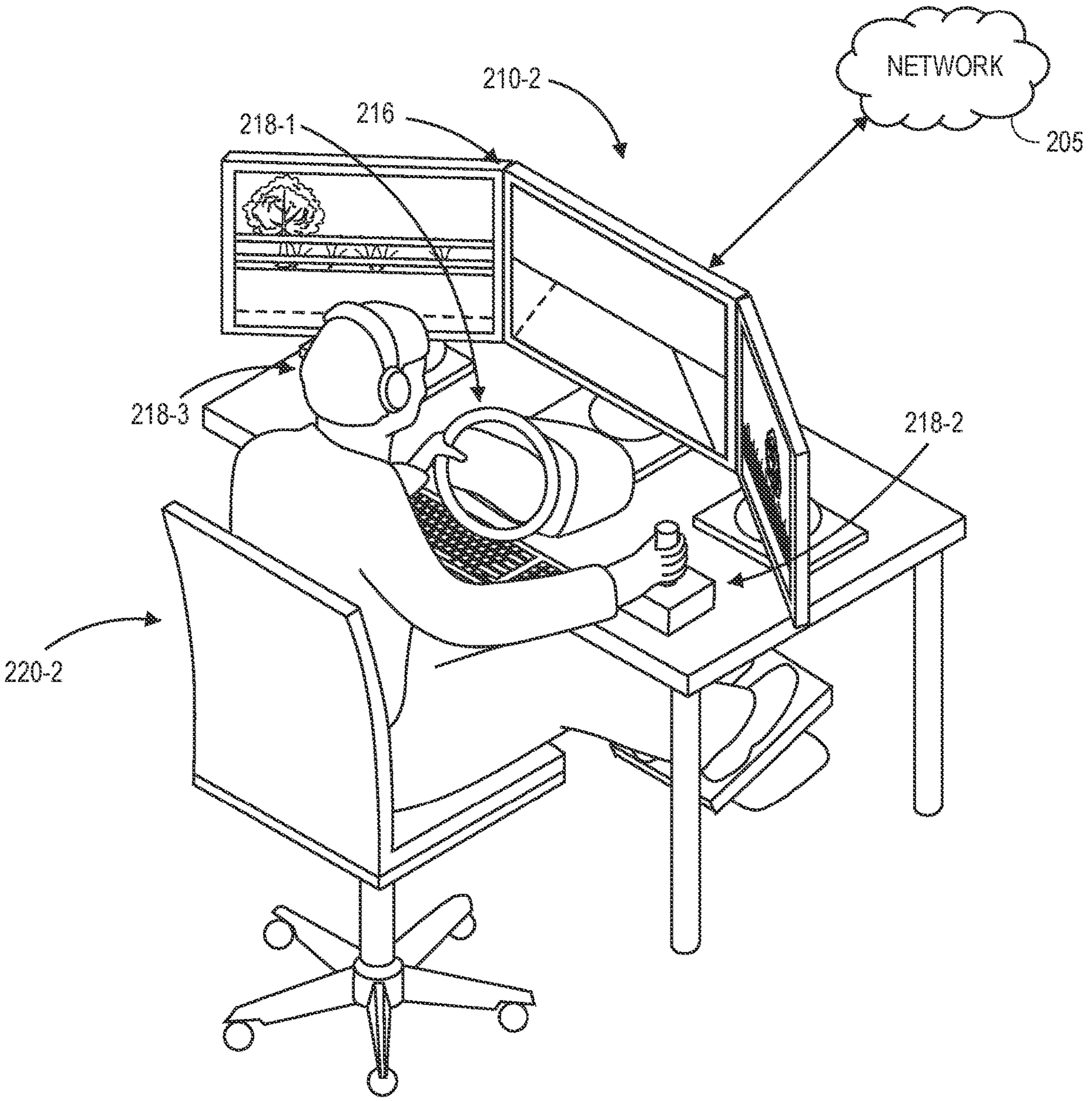

As is shown in FIG. 2G, control of the vehicle 202 may be transferred to a teleoperator 220-2 at the teleoperator station 210-2, which may include a display having a display (or presentation) device 216 and a plurality of control components (or input/output devices) 218-1, 218-2, 218-3, e.g., a keyboard 218-1, a joystick (or another operator) 218-2 and a headset 218-3. The teleoperator 220-2 may evaluate information or data received by the teleoperator station 210-2 from the vehicle 202, and make any determinations regarding an operational status or condition of the vehicle 202 based on the information or data. The teleoperator 220-2 may also provide one or more commands or instructions via the keyboard 218-1, the joystick 218-2 or the headset 218-3, and the teleoperator station 210-2 may transmit such commands or instructions to the vehicle 202 over the one or more wireless communications networks 205.

For example, imaging data 260-1, 260-2, 260-3 or information regarding the drive state 230 of the vehicle 202 received by the teleoperator station 210-2 from the vehicle 202 via the wireless communications networks 205 may be rendered on the display device 216, or any acoustic data received by the teleoperator station 210-2 from the vehicle 202 via the wireless communications networks 205 may be played by the headset 218-3. Additionally, the teleoperator 220-2 may manually enter commands or instructions using the keyboard 218-1, execute one or more gestures or other interactions to provide commands or instructions via the joystick 218-2, or utter one or more spoken words to provide commands or instructions to the headset 218-3, and the teleoperator station 210-2 may transmit information or data representing such commands or instructions to the vehicle 202 via the wireless communications networks 205.

Figure 2H:
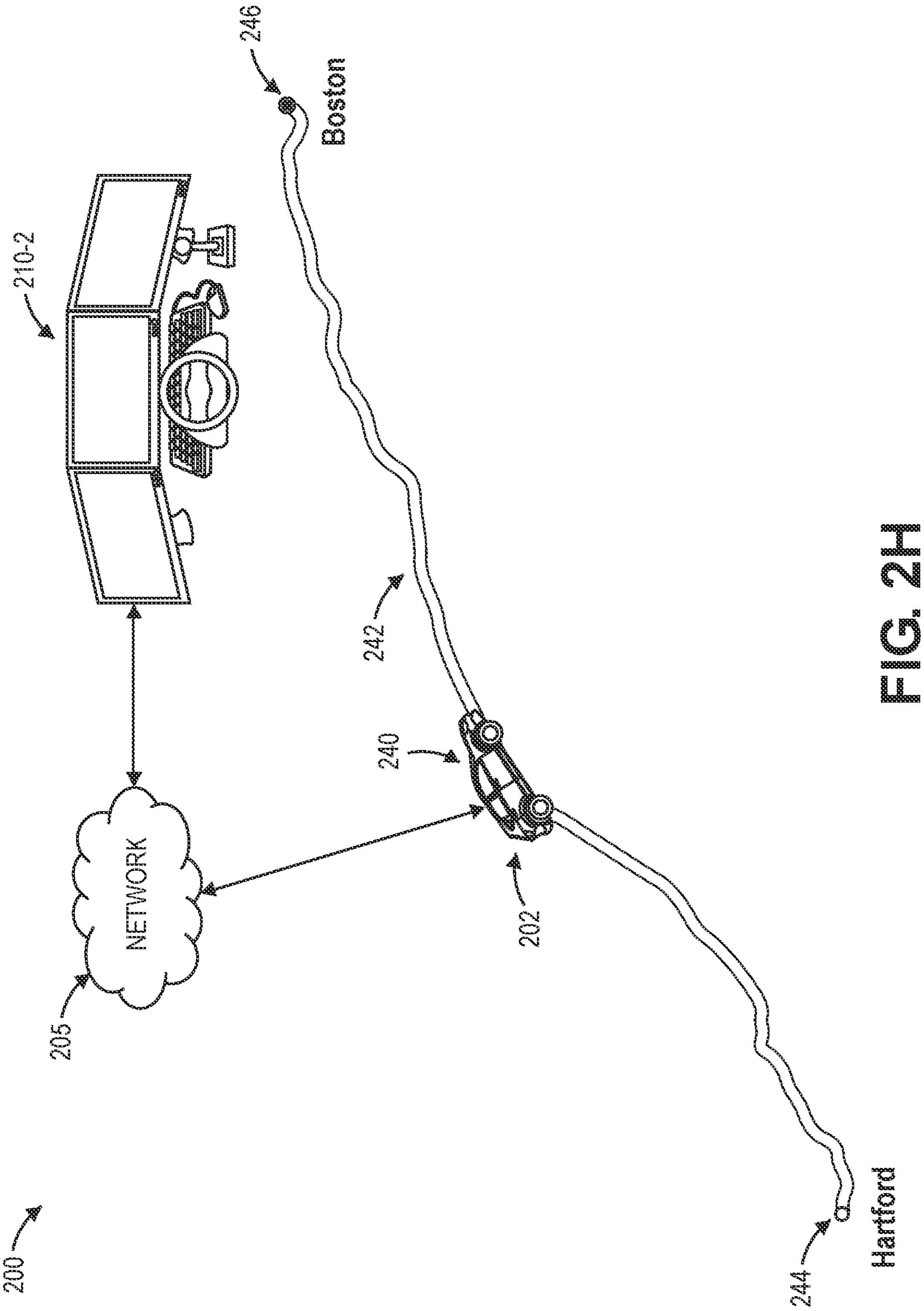

As is shown in FIG. 2H, the teleoperator station 210-2 may retain operational control of the vehicle 202 until the vehicle 202 arrives at the destination 246. Alternatively, in some implementations, the driver 240 may request to regain operational control over the vehicle 202 at any time. For example, the driver 240 may execute one or more interactions with a button or another interactive feature provided on the display 205 within the vehicle 202, and request to have operational control of the vehicle 202 transferred back to the driver 240 in a reciprocal manner to that shown in FIG. 2C. Alternatively, or additionally, the driver 240 may provide one or more utterances of spoken or sung words including such a request, and such utterances may be captured by any microphones or other acoustic sensors provided within the vehicle 202 and interpreted in a reciprocal manner to transfer operational control back to the driver 240.

Figure 3:
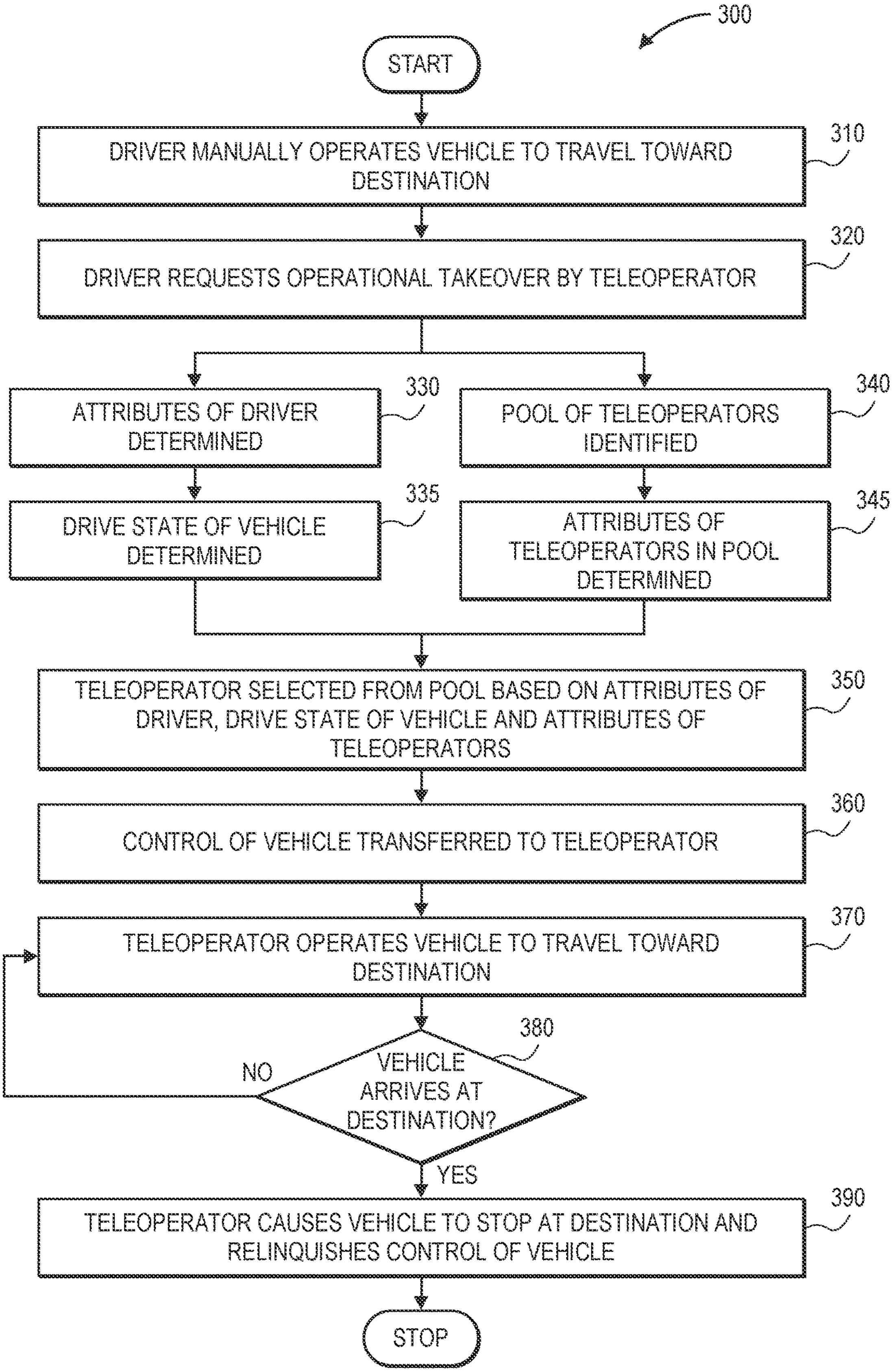
FIG. 3 is a flow chart of one process for transferring control of vehicles in accordance with implementations of the present disclosure.

Referring to FIG. 3, a flow chart 300 of one process for transferring control of vehicles in accordance with implementations of the present disclosure is shown. At box 310, a driver manually operates a vehicle to travel toward a destination. The driver may operate the vehicle using a steering wheel and one or more pedals, e.g., an accelerator and a brake pedal, as well as any number of other controllers or components such as a gear stick, a shift stick, a gear selector, or any other features. Alternatively, or additionally, the driver may operate the vehicle using one or more joysticks, wheels, buttons, switches or other components for establishing or changing a speed or a direction of the vehicle.

In some implementations, the vehicle may be a car, e.g., a powered, wheeled vehicle that is used for transportation, of any type or form that is configured for both manual and remote operation. For example, the vehicle may further include any number of actuators for remotely or locally controlling the vehicle, as well as one or more imaging devices, cameras, or other sensors for capturing imaging data from an environment of the vehicle, one or more sensors to detect or measure drive state information, or one or more interfaces for bi-directional communication between the vehicle and one or more teleoperator stations or other systems via a wireless communication network.

In some implementations, the vehicle may be a convertible, a coupe, a hatch back, a sedan, a sport-utility vehicle, a truck, a van, or any other type or form of car. The vehicle may include an engine or motor along with a drive train having a transmission, one or more driveshafts, axles, wheels or other components that may be provided or contained within a body or frame of any size or shape. The vehicle may further include any number of doors, windows, vents, or other features for providing access to the vehicle, as well as any number of chairs or seats for accommodating humans or other animals that may be arranged in rows or columns, and a trunk or any number of compartments or other spaces for storing one or more items.

At box 320, the driver requests an operational takeover of the vehicle by a teleoperator. For example, in some implementations, the driver may request the operational takeover by one or more interactions with any number of buttons, switches or other controls, which may be or include discrete physical components of the vehicle, or representations on a display (e.g., a touchscreen) of the vehicle or a mobile device associated with the driver. Alternatively, or additionally, the driver may request the operational takeover by one or more spoken utterances or sounds that may be captured by any number of microphones provided in association with the vehicle, or microphones of a mobile device or other computer system associated with the driver, and interpret such utterances or sounds to recognize the request.

At box 330, one or more attributes of the driver are determined. For example, upon receiving a request for the operational takeover from the driver, information or data identifying the driver or the vehicle, including but not limited to a location of the driver at a time of the request, or a destination for the driver, as well as any other attributes of the driver, e.g., a name, an age, any driving habits, tendencies or preferences of the driver, including any information or data representing a level of experience of the driver in driving the vehicle or other vehicles within the same class as the vehicle, in the same location or in similar locations. Alternatively, the attributes of the driver may include any other information or data regarding the driver.

At box 335, a drive state of the vehicle is determined. For example, the drive state of the vehicle may include an identifier of a velocity (e.g., speed) or an acceleration of the vehicle, a course (or direction) of the vehicle, Eulerian angles of the vehicle (e.g., a yaw angle, a pitch angle or a roll angle), a position of the vehicle, a steering angle of the vehicle, or any other attributes of the motion of the vehicle. The drive state may further include imaging data (e.g., images) or any other data captured by sensors provided aboard the vehicle at or prior to a time of the request.

In response to receiving the request for the operational takeover, an initial set of information or data regarding the drive state may be transferred from the vehicle to one or more external computer devices or systems. Subsequently, after receiving the request, information or data regarding the drive state may be streamed to one or more of such external computer devices or systems, in a synchronous or an asynchronous manner.

In parallel, at box 340, a pool of teleoperators is identified. For example, the pool of teleoperators may include teleoperators that are sufficiently qualified to remotely operate the vehicle, or a class of vehicles that includes the vehicle. Additionally, the pool of teleoperators may include teleoperators that have sufficient time in a shift or another period of work to perform the operational takeover, or to remotely control the vehicle for at least a portion of the distance from the location to the destination.

At box 345, attributes of the teleoperators in the pool are determined. For example, such attributes may identify or represent remote driving skills, traits or tendencies, as well as a level of experience or history in operating (either remotely or manually) vehicles of various types or classes, or a level of experience or history in remotely driving vehicles within a vicinity of the location or the destination of the vehicle. The attributes determined at box 345 may further include any other information or data regarding the respective teleoperators.

At box 350, a teleoperator is selected from the pool of teleoperators based on the attributes of the driver determined at box 330, the drive state of the vehicle determined at box 335, and the attributes of the teleoperators of the pool determined at box 345. For example, one teleoperator of the pool of teleoperators may be identified as a best or most appropriate fit for the driver or the vehicle, or for remotely operating the vehicle from the location to the destination. In some implementations, a teleoperator may be automatically selected based on a similarity between a driving profile of the driver (e.g., an average speed of the driver, a preferred route of the driver, or any other observed habits, tendencies or preferences of the driver) and a driving profile of the teleoperator (e.g., an average speed of the teleoperator, a preferred route of the teleoperator, or any other observed habits, tendencies or preferences of the teleoperator).

In some implementations, the teleoperator may be selected by the driver. For example, in some implementations, two or more teleoperators of the pool may be identified as appropriate fits for the driver or the vehicle, and information or data regarding each of the teleoperators so identified may be presented to the driver, in a manner that permits the driver to select one of the teleoperators based on the information or data. In some implementations, information or data such as an image or an avatar, a name, or a description of one or more attributes of each of the teleoperators may be visually presented to the driver on a display within the vehicle, or audibly presented to the driver by one or more speakers within the vehicle. The driver may be permitted to select one or more of the teleoperators by one or more interactions with the display, or by uttering one or more words or instructions.

At box 360, control of the vehicle is transferred to the teleoperator. For example, one or more channels for bi-directional communication may be established between the vehicle and a teleoperator station of the teleoperator selected at box 350, e.g., over one or more wireless communication networks, which may include the Internet in whole or in part.

In some implementations, where the vehicle is outfitted with one or more actuators for remotely or locally controlling the vehicle, such actuators may be configured to receive commands or instructions for controlling the vehicle from the teleoperator station, and restricted or prevented from receiving commands or instructions for controlling the vehicle from the steering wheel, pedals or other controls within the vehicle. Likewise, the vehicle may be configured to transmit information or data captured by any imaging devices, cameras or other sensors provided aboard the vehicle to the teleoperator station or other systems via the one or more wireless communication networks.

At box 370, the teleoperator operates the vehicle to travel toward the destination. For example, the teleoperator may visually evaluate information or data rendered in one or more displays, e.g., imaging data captured by imaging devices or other sensors provided aboard the vehicle, and execute one or more gestures or interactions with control systems provided at the teleoperator station to generate commands or instructions for operating the vehicle. The teleoperator may select courses or speeds for the vehicle, as well as routes traveled by the vehicle, or any other parameters of the vehicle, e.g., engine gears or speeds, onboard climate conditions such as temperatures, entertainment selections such as music or other media, whether windows or other openings are to be open or closed during operations, or the like.

In some implementations, an extent to which a teleoperator is granted control over a vehicle may be designated or selected by the driver. For example, in some implementations, a driver may designate that the teleoperator may have unlimited control over and unfettered access to any systems provided aboard the vehicle. Alternatively, in some other implementations, the driver may indicate that the teleoperator may have full control over courses, speeds, routes or other operational parameters of the vehicle, but limited or no control over any other parameters that may but need not be related to or required for operating the vehicle, such as onboard climate conditions or entertainment selections, or others.

At box 380, whether the vehicle has arrived at the destination is determined. If the vehicle has not yet arrived at the destination, then the process returns to box 370, where the teleoperator continues to operate the vehicle to travel toward the destination.

If the vehicle has arrived at the destination, then the process advances to box 390, where the teleoperator causes the vehicle to stop at the destination and relinquishes control of the vehicle, and the process ends. For example, the teleoperator may provide one or more commands or instructions to the vehicle for causing the vehicle to park in a safe location associated with the destination, and may terminate bi-directional communication channels between the teleoperator station and the vehicle.

Alternatively, in some implementations, the teleoperator may transfer operational control of the vehicle to another teleoperator, who may be automatically selected in any manner, such as that is described above with respect to box 350, or selected by the driver. In some other implementations, the driver may request to take operational control from the teleoperator, e.g., by one or more interactions with any number of buttons, switches or other controls, or by one or more spoken utterances or sounds that may be captured by any number of microphones, and interpreted as instructions to relinquish control back to the driver.

As is discussed above, in some implementations, information or data regarding a drive state of a vehicle, or any other information or data, may be interpreted to determine whether a transfer of operational control of the vehicle to a teleoperator should be recommended to a driver of the vehicle. Referring to FIGS. 4A through 4I, views of aspects of one system 400 for transferring control of vehicles in accordance with implementations of the present disclosure are shown. Except where otherwise noted, reference numerals preceded by the number "4" shown in FIGS. 4A through 4I indicate components or features that are similar to components or features having reference numerals preceded by the number "2" shown in FIGS. 2A through 2H or by the number "1" shown in FIG. 1.

Figure 4A:
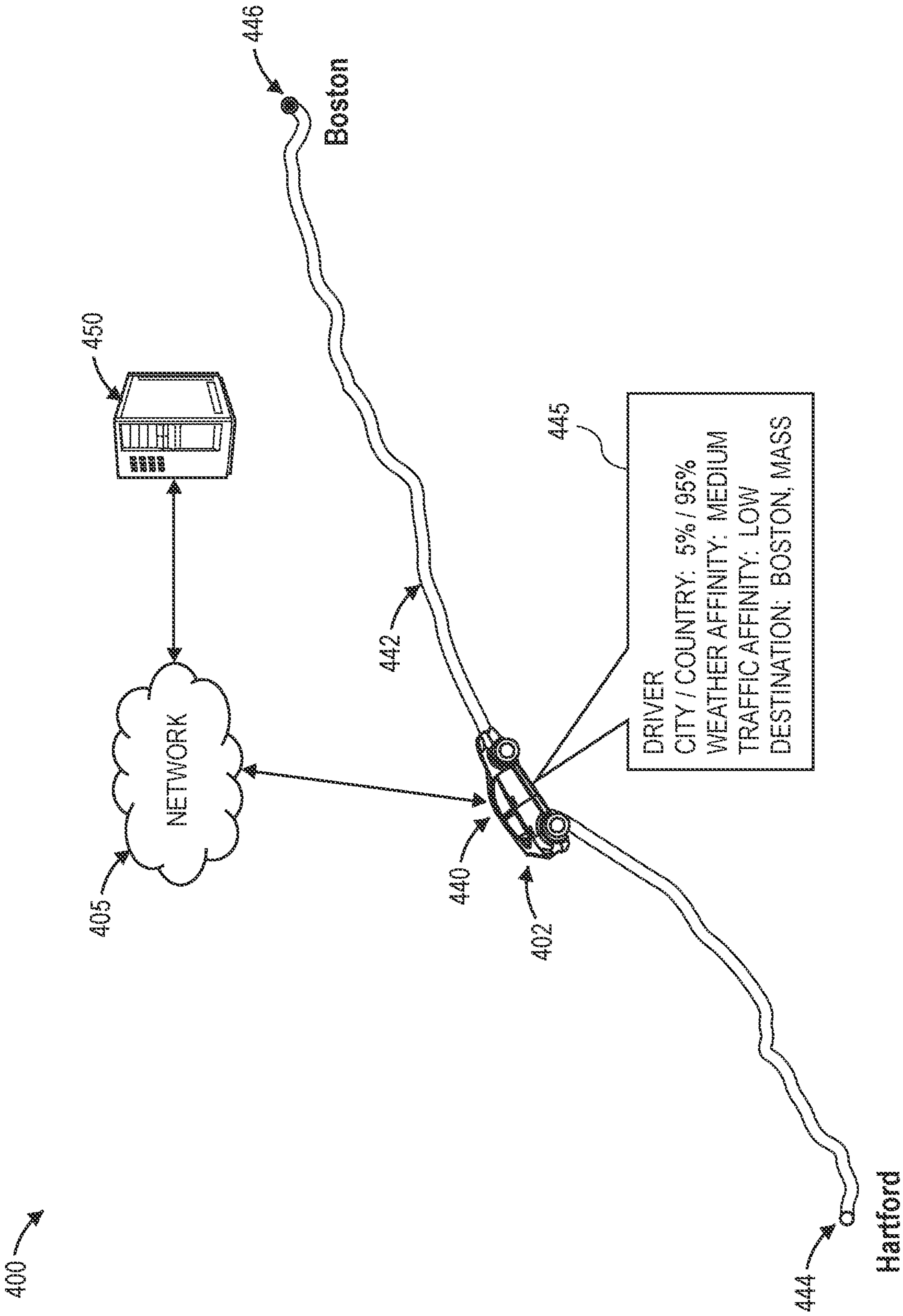
FIGS. 4A through 4I are views of aspects of one system for detecting events in accordance with implementations of the present disclosure.

As is shown in FIG. 4A, a vehicle 402 travels along a route 442 from an origin 444 (viz., Hartford) to a destination 446 (viz., Boston), under the operational control of a driver 440. The vehicle 402 may be an automobile of any type or form, and the route 442 may include any number of roads of any capacity or rating. As is also shown in FIG. 4A, the vehicle 402 is in communication with a computer system 450 over one or more wireless communications networks 405, which may include the Internet in whole or in part.

As is further shown in FIG. 4A, the vehicle 402 transmits information or data regarding attributes 445 of the driver 440 to the computer system 450 over the one or more wireless communication networks 405. For example, as is shown in FIG. 4A, the attributes 445 indicate that the driver 440 drives approximately five percent of the time in cities (or urban environments), and ninety-five percent of the time in the country (or a suburban or rural environment). The attributes 445 also indicate that the driver 440 has a medium affinity or tolerance for poor weather, and a low affinity (or tolerance) for traffic. The attributes 445 further indicate that the driver 440 is headed to the destination 446.

Figure 4B:
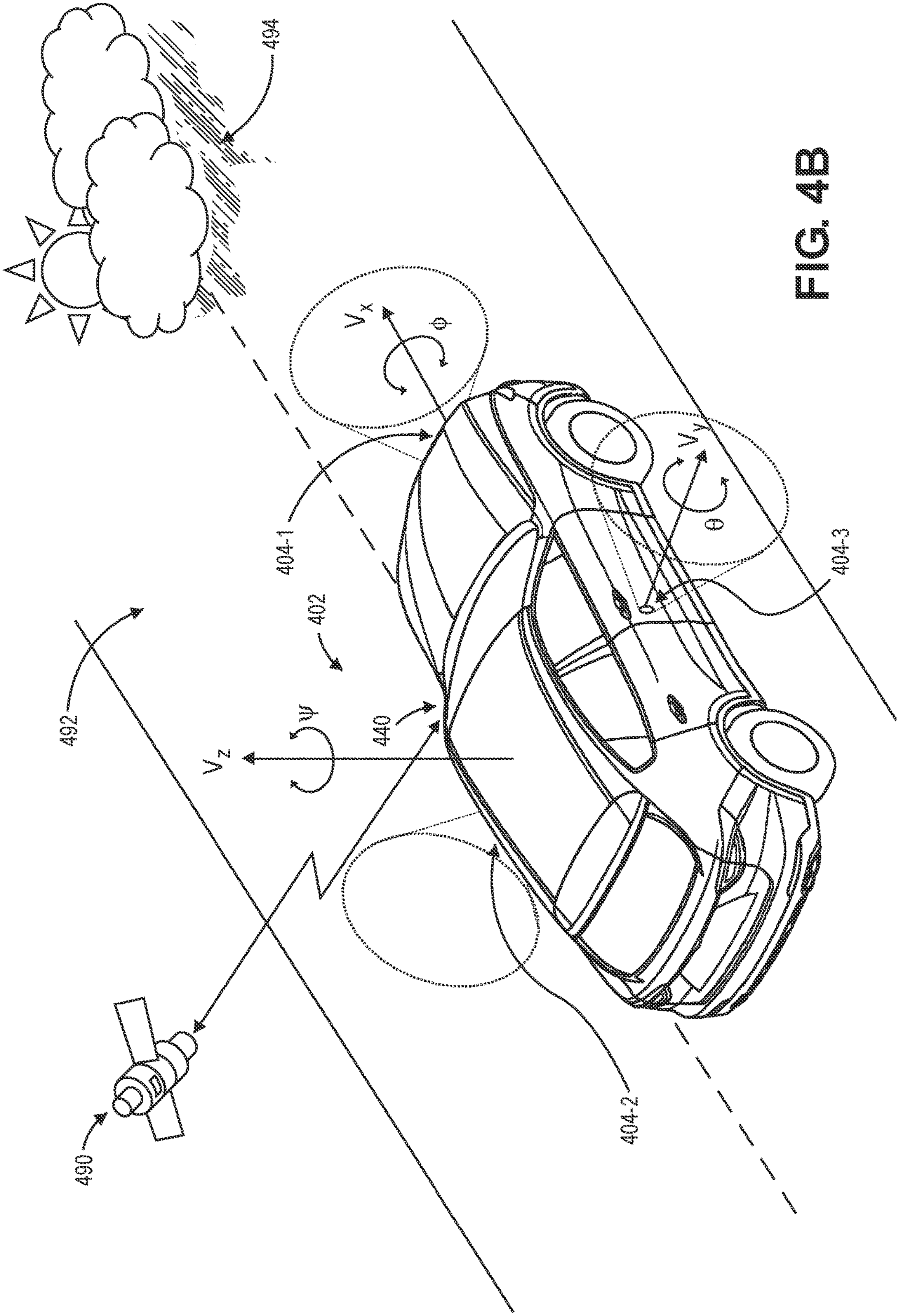

As is shown in FIG. 4B, the vehicle 402 may be outfitted with a plurality of sensors, and configured to capture information or data regarding a drive state of the vehicle 402, and any operational conditions of the vehicle 402 or conditions in an environment in which the vehicle 402 is traveling. For example, as is shown in FIG. 4B, the vehicle 402 may be equipped with imaging devices 404-1, 404-2, 404-3 (e.g., cameras) that are aligned to capture imaging data, e.g., visual images, depth images, or other imaging data, from fields of view extending forward of, from a left side (or port side) of, or from a right side (or starboard side) of the vehicle 402. The vehicle 402 may also be outfitted with one or more inertial measurement units or other sensors for determining velocities along or about one or more principal axes of the vehicle 402, as well as Eulerian angles (e.g., yaw angles, pitch angles, roll angles) of the vehicle 402, as the vehicle 402 travels along the route 442. The vehicle 402 may further include one or more position sensors for receiving positional signals from one or more orbiting satellites 490 or from any other source (e.g., cellular transmission towers). The vehicle 402 may also include one or more weather sensors for determining data 492 regarding traffic conditions or data 494 regarding weather conditions within a vicinity of the vehicle 402, or along the route 442 of the vehicle 402.

Figure 4C:
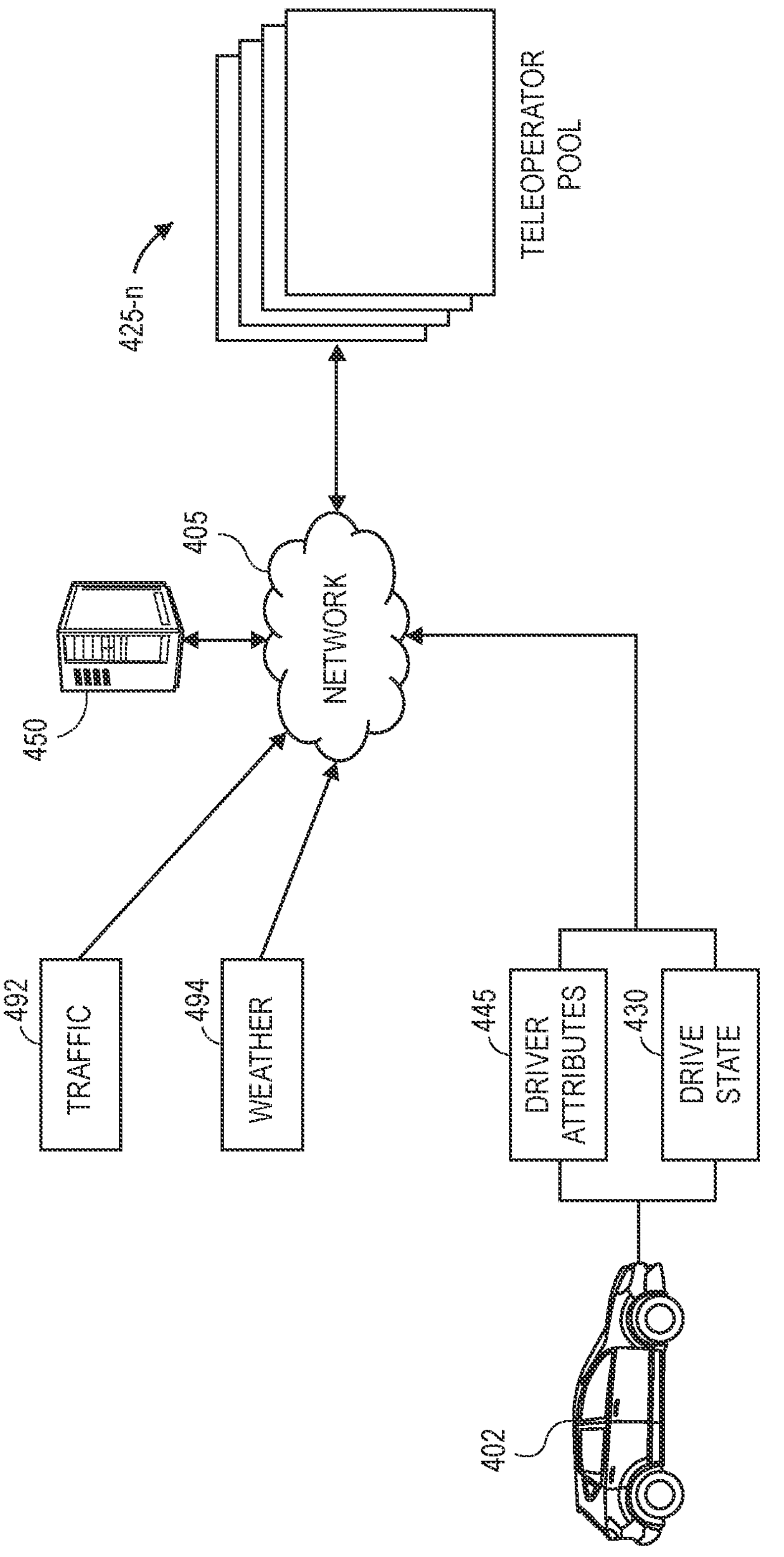

As is shown in FIG. 4C, the data 492, 494 regarding the traffic and weather conditions, the information or data regarding a drive state 430 of the vehicle 402 and the information or data regarding the attributes 445 of the driver 440 are provided to the computer system 450 over the one or more wireless communications networks 405. The computer system 450 then compares the data 492, 494 and the information or data regarding the drive state 430 and the attributes 445 to information **425-*n* regarding a plurality of teleoperators in a pool to identify one or more teleoperators that may be suitable for taking over operational control of the vehicle 402 from the driver 440**.

Figure 4D:
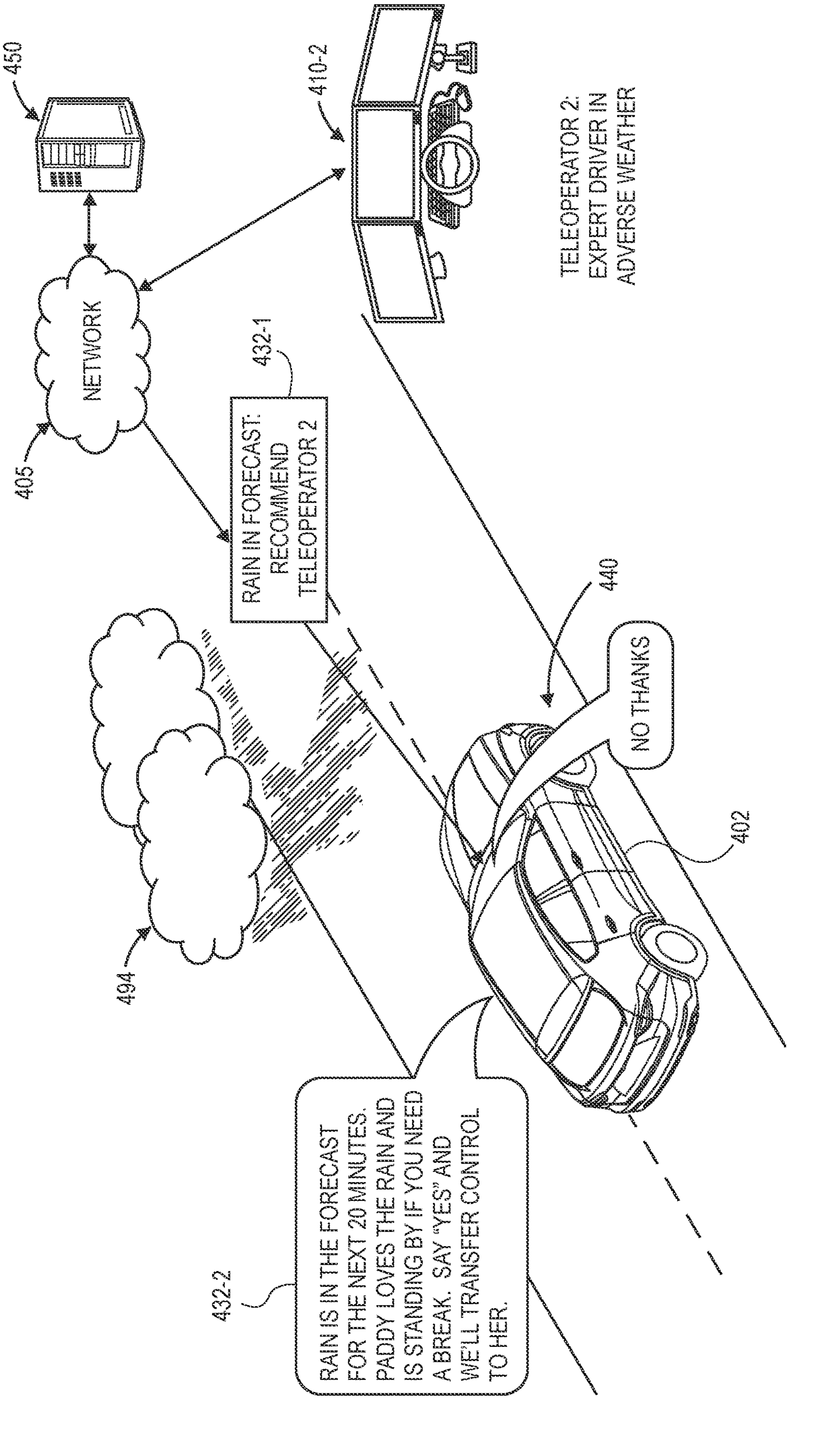

As is shown in FIG. 4D, the computer system 450 determines that one of the teleoperators 420-2 of the pool is particularly well-suited to take control of the vehicle 402 in adverse weather conditions. The computer system 450 then establishes a channel for bi-directional communications between the vehicle 402 and a teleoperator station 410-2 of the teleoperator 420-2, and begins transferring information or data regarding the operation of the vehicle 402 to the teleoperator station 410-2. Such information or data may include, but need not be limited to, imaging data captured by the imaging devices 404-1, 404-2, 404-3, e.g., visual images, depth images, or other imaging data, as well as any other relevant information or data regarding the drive state 430 or the attributes 445 of the driver 440.

The computer system 450 also transmits a recommendation 432-1 (e.g., a message, a signal or another set of information or data) to the vehicle 402 that the teleoperator 420-2 take over operational control of the vehicle 402, and the recommendation 432-1 may then be presented to the driver 440 by acoustic data representing spoken words 432-2 via one or more speakers within the vehicle 402. In particular, as is shown in FIG. 4D, the spoken words 432-2 indicate that "rain is in the forecast for the next 20 minutes. Paddy loves the rain and is standing by if you need a break. Say 'Yes' and we'll transfer control to her." When the driver 440 replies with an utterance of, "no thanks," acoustic data representing the utterance may be captured by one or more microphones or other acoustic sensors within the vehicle 402 and interpreted as an indication that the recommendation 432-1 was declined. The computer system 450 may then disestablish or open the channel for bi-directional communications between the vehicle 402 and the teleoperator station 410-2, or take any other relevant actions upon determining that the recommendation 432-1 was declined.

Figure 4E:
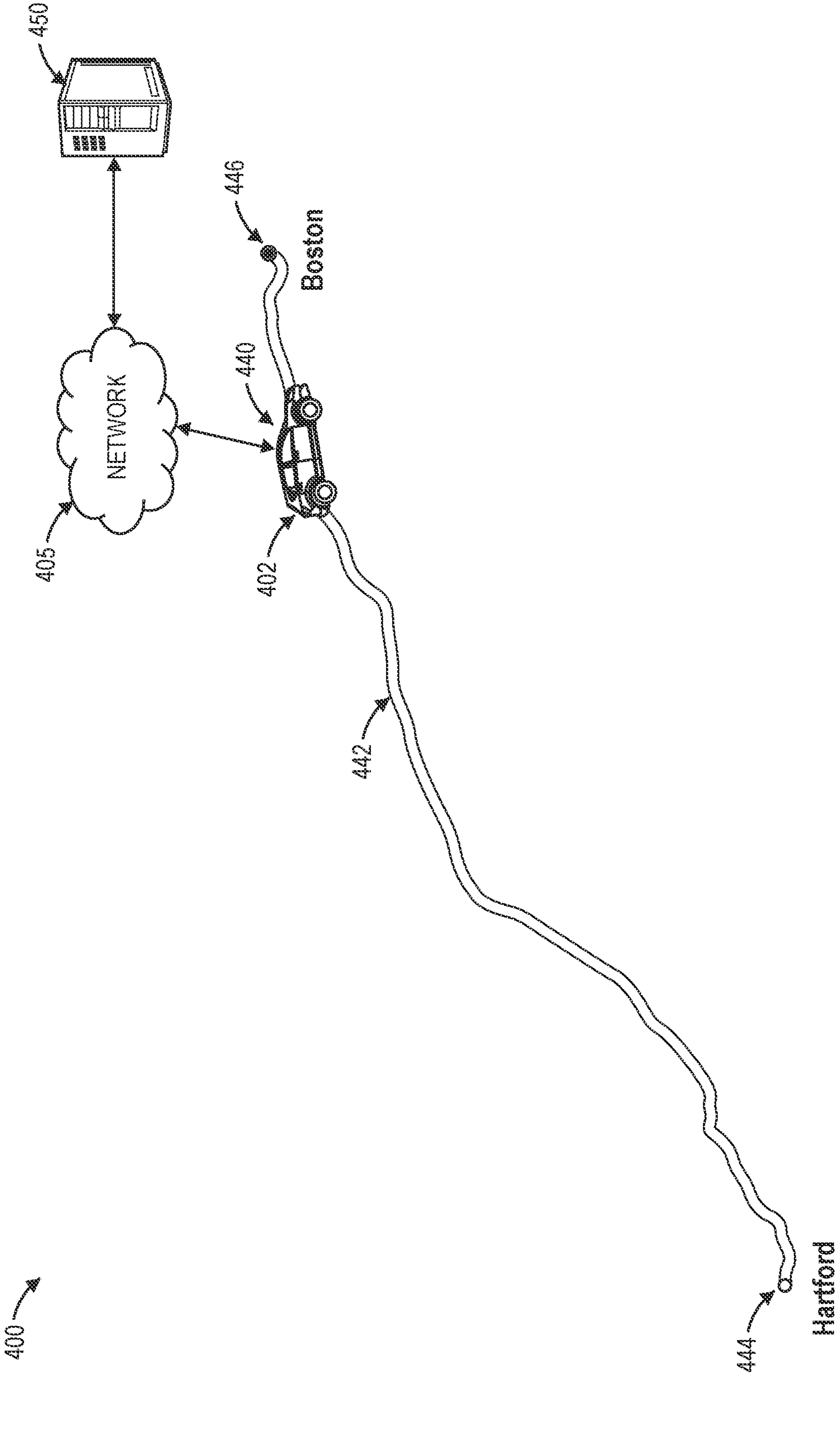
Figure 4F:
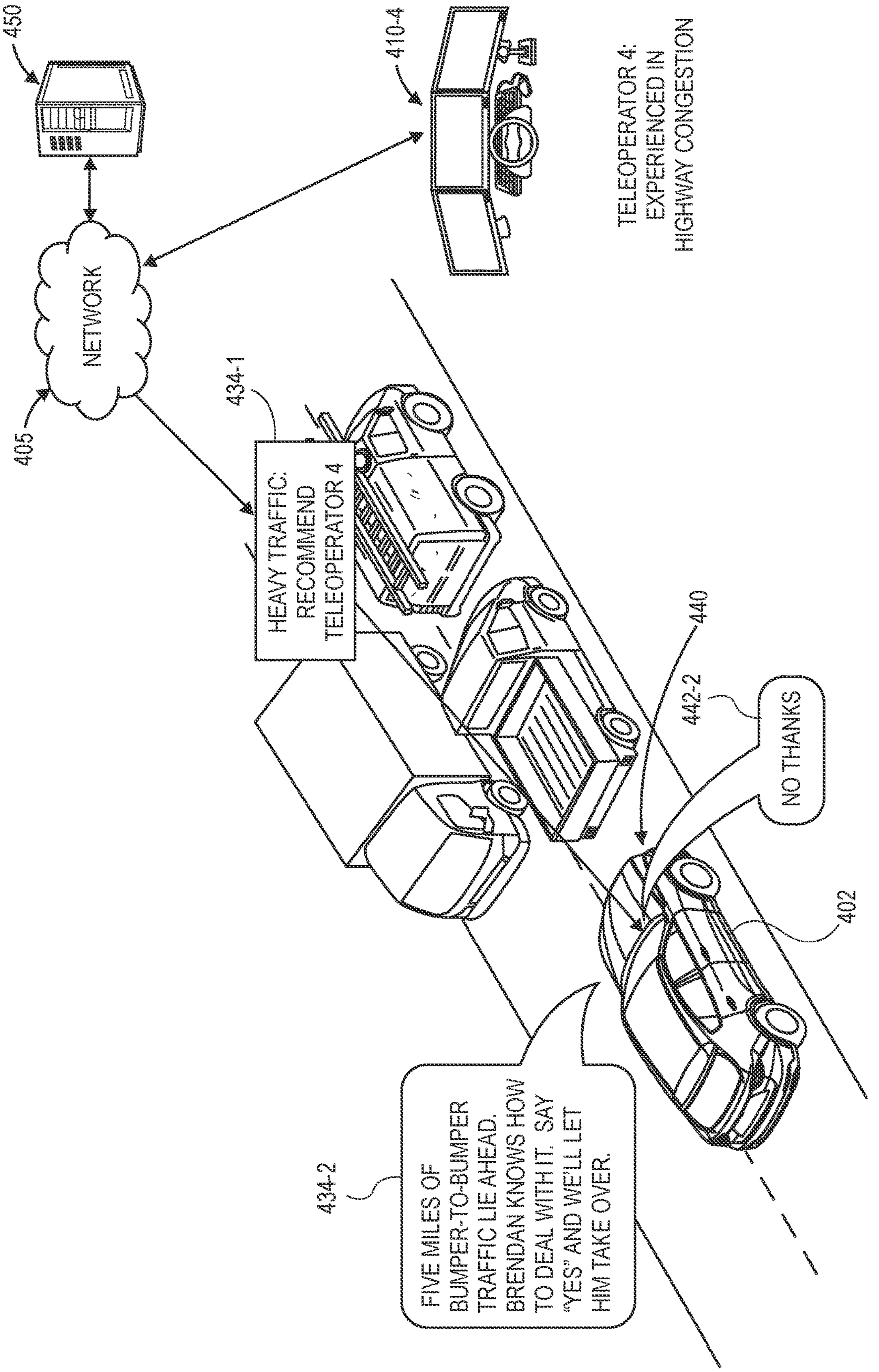

As is shown in FIG. 4E, the vehicle 402 approaches the destination 446 and encounters increased traffic conditions along the route 442. As is shown in FIG. 4F, the computer system 450 determines that one of the teleoperators 420-4 is particularly well-suited to take control of the vehicle 402 in adverse traffic conditions. The computer system 450 then establishes a channel for bi-directional communications between the vehicle 402 and a teleoperator station 410-4 of the teleoperator 420-4, and begins transferring information or data regarding the operation of the vehicle 402 to the teleoperator station 410-4. Such information or data may include, but need not be limited to, imaging data captured by the imaging devices 404-1, 404-2, 404-3, as well as any other relevant information or data regarding the drive state 430 or the attributes 445 of the driver 440.

The computer system 450 also transmits a recommendation 434-1 (e.g., a message, a signal or another set of information or data) to the vehicle 402 that the teleoperator 420-4 take over operational control of the vehicle 402, and the recommendation 434-1 may then be presented to the driver 440 by acoustic data representing spoken words 434-2 via one or more speakers within the vehicle 402. In particular, as is shown in FIG. 4F, the spoken words 434-2 indicate that "five miles of bumper-to-bumper traffic lie ahead. Brendan knows how to deal with it. Say 'yes' and we'll let him take over for you." When the driver 440 again replies with an utterance of, "no thanks," acoustic data representing the utterance may be captured by one or more microphones or other acoustic sensors within the vehicle 402 and interpreted as an indication that the recommendation 434-1 was declined. The computer system 450 may then disestablish or open the channel for bi-directional communications between the vehicle 402 and the teleoperator station 410-4, or take any other relevant actions upon determining that the recommendation 434-1 was declined.

Figure 4G:
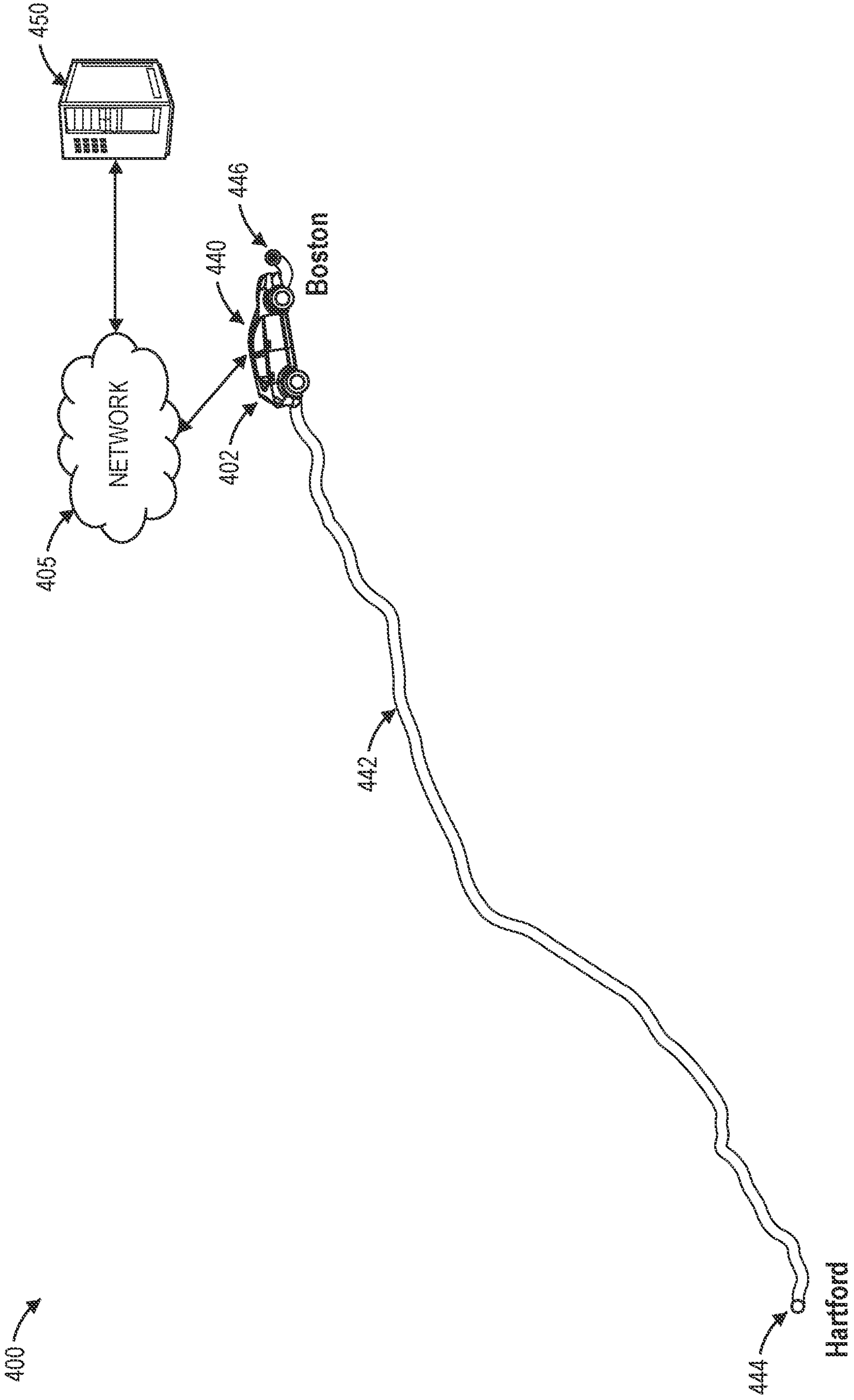
Figure 4H:
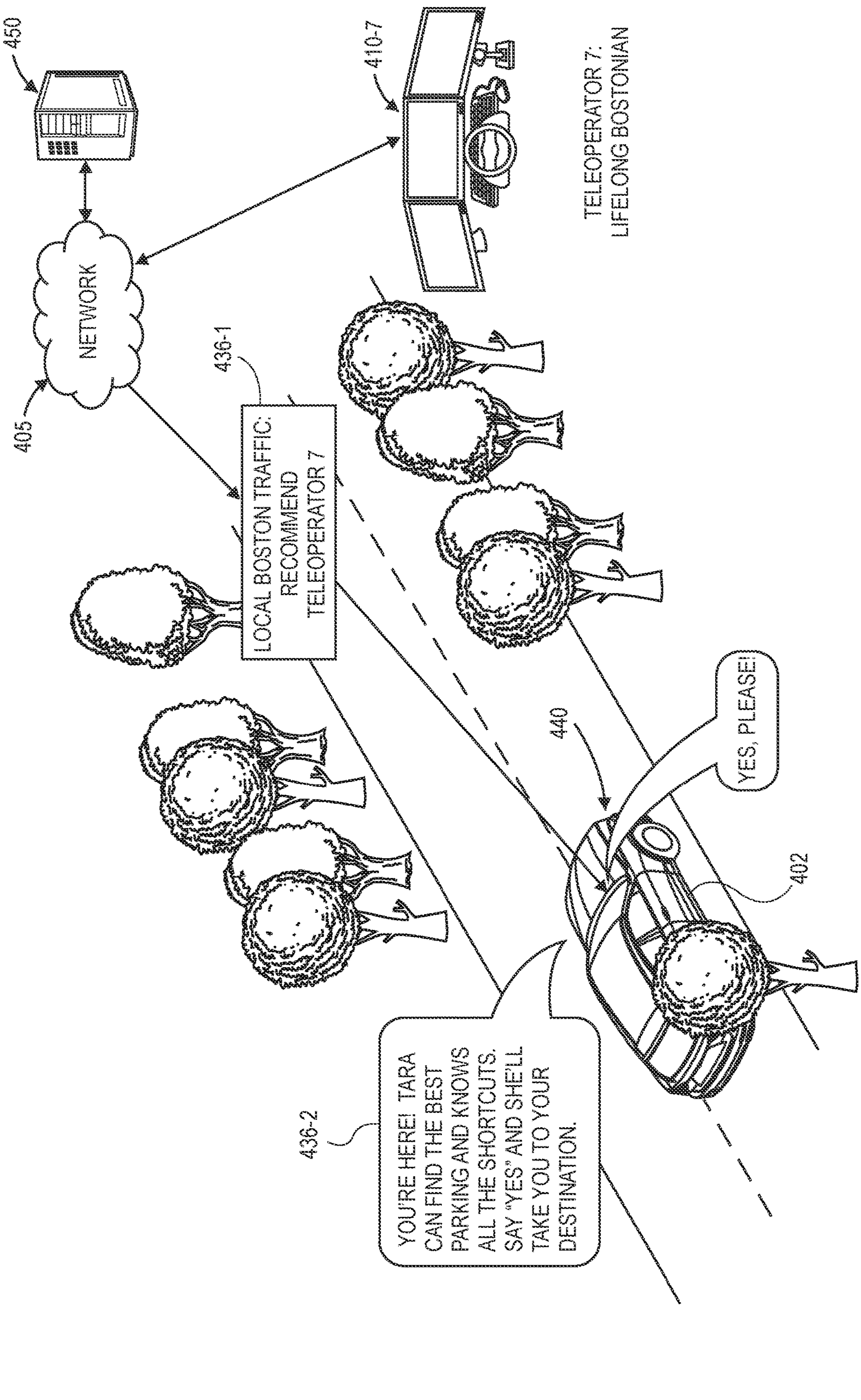

As is shown in FIG. 4G, the vehicle 402 nears an end of the route 442 and is within close proximity of the destination 446. As is shown in FIG. 4H, the computer system 450 determines that one of the teleoperators 420-7 is particularly well-suited to take control of the vehicle 402 at the destination 446. The computer system 450 then establishes a channel for bi-directional communications between the vehicle 402 and a teleoperator station 410-7 of the teleoperator 420-7, and begins transferring information or data regarding the operation of the vehicle 402 to the teleoperator station 410-7. Such information or data may include, but need not be limited to, imaging data captured by the imaging devices 404-1, 404-2, 404-3, as well as any other relevant information or data regarding the drive state 430 or the attributes 445 of the driver 440.

The computer system 450 also transmits a recommendation 436-1 (e.g., a message, a signal or another set of information or data) to the vehicle 402 that the teleoperator 420-7 take over operational control of the vehicle 402, and the recommendation 436-1 may then be presented to the driver 440 by acoustic data representing spoken words 436-2 via one or more speakers within the vehicle 402. In particular, as is shown in FIG. 4H, the spoken words 436-2 indicate that "you're here! Tara can find the best parking and knows all the shortcuts. Say 'yes' and she'll take you to your destination." When the driver 440 replies with an utterance of, "yes please!" acoustic data representing the utterance may be captured by one or more microphones or other acoustic sensors within the vehicle 402 and interpreted as an indication that the recommendation 436-1 was accepted.

Figure 4I:
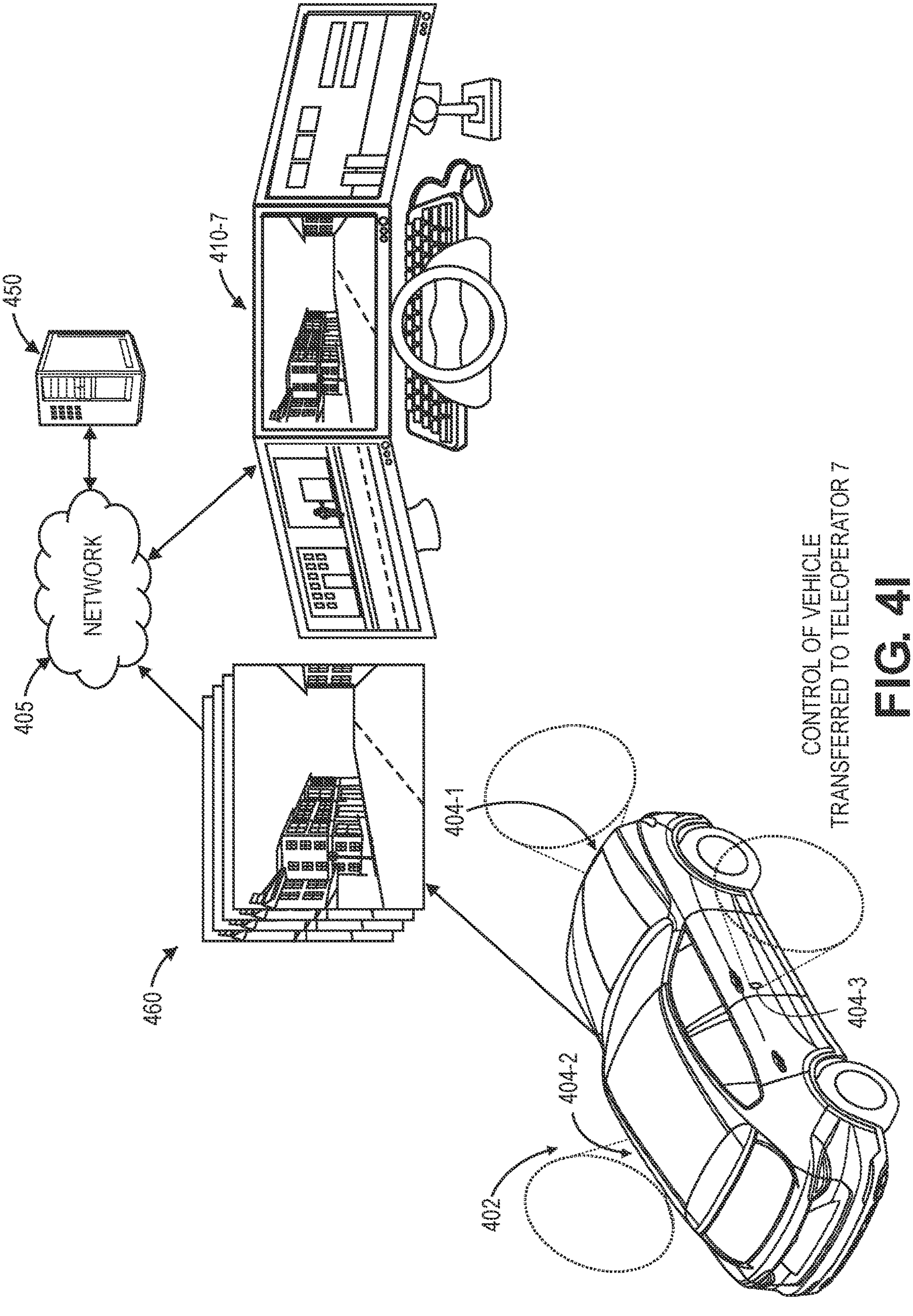

As is shown in FIG. 4I, upon determining that the recommendation 436-1 was accepted, the vehicle 402 then grants control over the operation of the vehicle 402 to the teleoperator station 410-7, where the teleoperator 420-7 may provide commands or instructions for operating the vehicle 402 via one or more control components (or input/output devices). Such commands or instructions may be transmitted to the vehicle 402, and imaging data 460 or other information or data regarding the operation of the vehicle 402 may be returned to the teleoperator station 410-7, until the vehicle 402 arrives at the destination 446 or until operational control is transferred back to the driver 440 within the vehicle 402.

Figure 5:
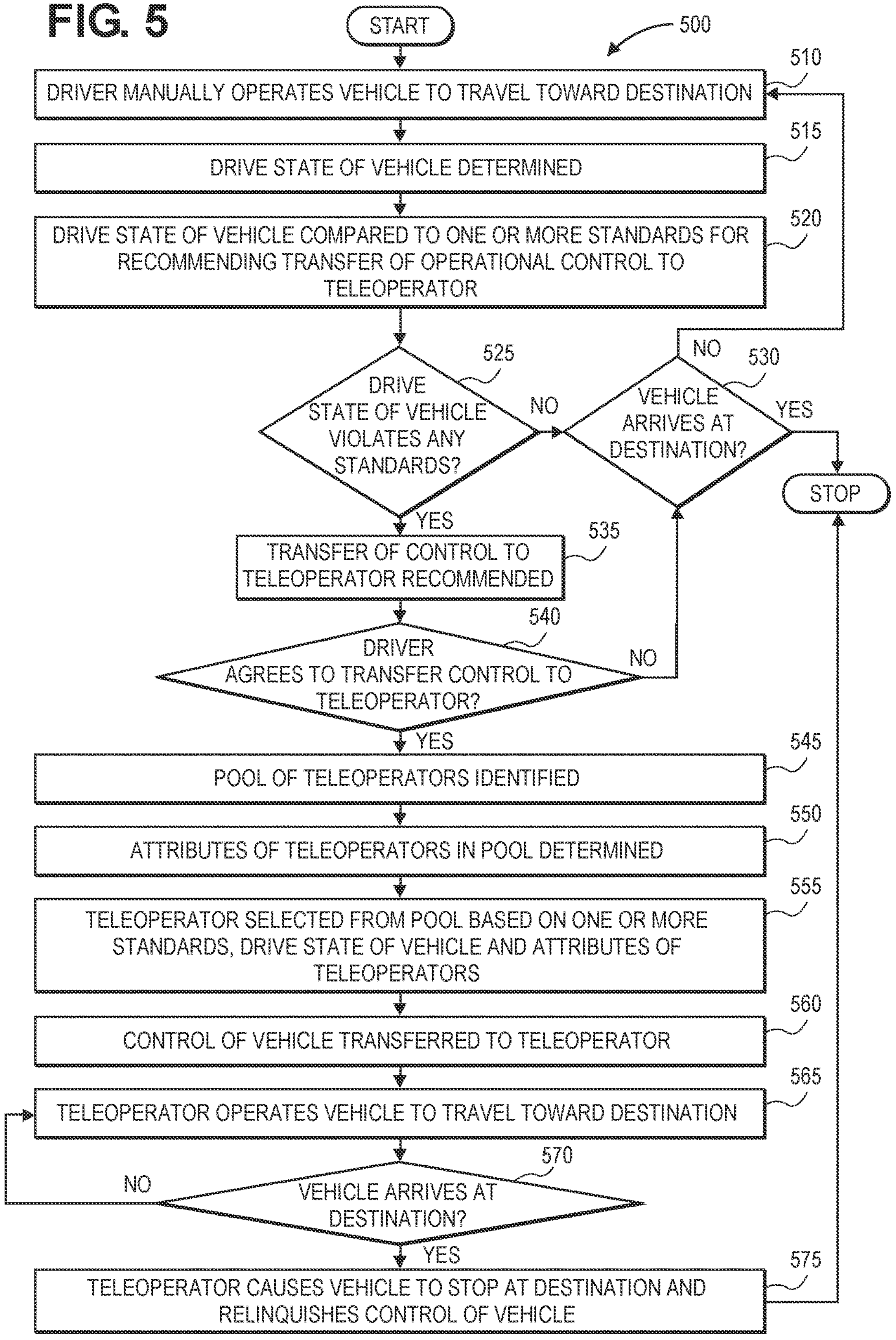
FIG. 5 is a flow chart of one process for transferring control of vehicles in accordance with implementations of the present disclosure.

Referring to FIG. 5, a flow chart 500 of one process for transferring control of vehicles in accordance with implementations of the present disclosure is shown. At box 510, a driver manually operates a vehicle to travel toward a destination. For example, the driver may operate a steering wheel, one or more pedals (e.g., an accelerator and a brake), or any other controllers or components for local operations, such as transmission selectors or gear shifts, to cause the vehicle to travel on a selected course and at a selected speed. Alternatively, or additionally, the driver may also operate any environmental control systems (e.g., heating or air conditioning), entertainment systems (e.g., sound systems), or any other controllers or components during the local operations.

At box 515, a drive state of the vehicle is determined. For example, the drive state of the vehicle may identify a position (e.g., a latitude and longitude) of the vehicle, a course and a speed of the vehicle, a steering wheel angle of the vehicle, a rotational speed and/or gear of an engine of the vehicle, as well as a yaw angle, a pitch angle and a roll angle of the vehicle, or any other information or data regarding the operations of the vehicle. Alternatively, or additionally, one or more attributes of the driver may also be determined at box 515. Such attributes may indicate operational preferences of the driver, e.g., an affinity or tolerance for local operations in various weather or traffic conditions, as well as general types of locations (e.g., urban, suburban or rural) or specific locations (e.g., specific towns, cities, counties or states) where the driver prefers, or does not prefer, to locally operate a vehicle.

At box 520, the drive state of the vehicle determined at box 515 is compared to one or more standards for recommending a transfer of operational control of the vehicle to a teleoperator. For example, the one or more standards may relate to traffic conditions, weather conditions, durations of local operations, levels of familiarity with routes or traffic within or around certain locations, local regulations (e.g., speed limits), environmental restrictions (e.g., fuel consumption, noise generation), or the like. When the local operation of a vehicle meets or exceeds any of such conditions, durations, or levels of familiarity, restrictions or other standards, an operational takeover of the vehicle by a teleoperator may be recommended to the operator.

At box 525, whether the drive state of the vehicle violates any of the standards is determined. For example, the position, course and speed of the vehicle, or any other information or data regarding the drive state of the vehicle, or any attributes of the driver, may indicate that the vehicle is approaching, meeting or exceeding any of the standards for recommending a transfer of operational control to a teleoperator, such as where the vehicle is within or approaching a location or an area with adverse weather conditions or adverse traffic conditions, an area with operational restrictions, or a location or an area in which the driver is known or believed to prefer to not locally operate a vehicle.

If the drive state of the vehicle does not violate any of the standards for recommending a transfer of operational control to a teleoperator, then the process advances to box 530, where whether the vehicle has arrived at the destination is determined. If the vehicle has arrived at the destination, then the process ends. If the vehicle has not arrived at the destination, however, then the process returns to box 510, where the drive continues to manually operate the vehicle to travel toward the destination, and to box 515, where the drive state of the vehicle is determined. The drive state of the vehicle may be determined at any rate or frequency, e.g., at a frequency of ten hertz (or ten times per second), one hundred hertz (or one hundred times per second), or at any other rate or frequency.

If the drive state of the vehicle is determined to violate one or more of the standards, however, then the process advances to box 535, where the transfer of operational control to a teleoperator is recommended to the driver. For example, in some implementations, a message, a signal or another set of information or data including or representing a recommendation for a transfer of operational control may be transmitted to the vehicle and caused to be rendered on a display within the vehicle along with one or more interactive features for accepting or declining the recommendation, e.g., a message such as "A teleoperator is standing by to take control in this awful traffic. Please press 'OK' to transfer operational control, or 'Cancel' to maintain local control." Alternatively, or additionally, in some implementations, some or all of the information or data regarding the recommendation may be audibly played by one or more speakers of a mobile device of the driver or otherwise within the vehicle, and the driver may accept or decline the recommendation by uttering one or more voice commands that are captured by one or more microphones or other sensors provided on the mobile device of the driver or otherwise within the vehicle.

At box 540, whether the driver agrees to transfer operational control to a teleoperator is determined. For example, the driver may accept a recommendation to transfer operational control of the vehicle to a teleoperator by one or more gestures or other interactions, e.g., with a display within the vehicle, or by uttering one or more voice commands.

If the driver does not agree to transfer operational control to a teleoperator, then the process returns to box 530, where whether the vehicle has arrived at the destination is determined.

If the driver agrees to transfer operational control to a teleoperator, however, then the process advances to box 545, where a pool of teleoperators is identified, and to box 550, attributes of the teleoperators of the pool are determined. For example, the pool of teleoperators may include teleoperators that are sufficiently qualified to remotely operate the vehicle, or a class of vehicles that includes the vehicle, and may be selected based on the drive state determined at box 515, any attributes of the driver, any standards that have been determined to have been violated based on the drive state, or any basis for recommending that the driver transfer operational control to a teleoperator. Additionally, the pool of teleoperators may include teleoperators that have sufficient time in a shift or another period of work to perform the operational takeover, or to remotely control the vehicle for at least a portion of the distance from the location to the destination. Moreover, attributes of the teleoperators of the pool may identify or represent remote driving skills, traits or tendencies, as well as a level of experience or history in operating (either remotely or manually) vehicles of various types or classes, or a level of experience or history in remotely driving vehicles within a vicinity of the location or the destination of the vehicle, or any other information or data regarding the respective teleoperators.

At box 555, a teleoperator is selected from the pool of teleoperators based on the one or more standards that were determined to have been violated at box 525, the drive state of the vehicle determined at box 515, and the attributes of the teleoperators of the pool determined at box 550, or on any other basis. For example, one teleoperator of the pool of teleoperators may be identified as a best or most appropriate fit for the driver or the vehicle, or for remotely operating the vehicle from the location to the destination, based on the drive state, the standards, the attributes, or on any other basis. In some implementations, the teleoperator may be selected by the driver. For example, in some implementations, information or data such as an image or an avatar, a name, or a description of one or more attributes of each of the teleoperators may be visually presented to the driver on a display within the vehicle, or audibly presented to the driver by one or more speakers within the vehicle. The driver may be permitted to select one or more of the teleoperators by one or more interactions with the display, or by uttering one or more words or instructions.

At box 560, operational control of the vehicle is transferred to the teleoperator selected at box 555. For example, one or more channels for bi-directional communication may be established between the vehicle and a teleoperator station of the teleoperator selected at box 555, e.g., over one or more wireless communication networks, which may include the Internet in whole or in part.

At box 565, the teleoperator operates the vehicle to travel toward the destination. For example, the teleoperator may visually evaluate information or data rendered in one or more displays, e.g., imaging data captured by imaging devices or other sensors provided aboard the vehicle, and execute one or more gestures or interactions with control systems provided at the teleoperator station to generate commands or instructions for operating the vehicle. The teleoperator may select courses or speeds for the vehicle, as well as routes traveled by the vehicle, or any other parameters of the vehicle, e.g., engine gears or speeds, onboard climate conditions such as temperatures, entertainment selections such as music or other media, whether windows or other openings are to be open or closed during operations, or the like.

At box 570, whether the vehicle has arrived at the destination is determined. If the vehicle has not yet arrived at the destination, then the process returns to box 565, where the teleoperator continues to operate the vehicle to travel toward the destination.

If the vehicle has arrived at the destination, then the process advances to box 575, where the teleoperator causes the vehicle to stop at the destination and relinquishes control of the vehicle, and the process ends.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Additionally, it should also be appreciated that the detailed description is set forth with reference to the accompanying figures. In the figures, the use of the same reference numbers in different figures indicates similar or identical items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Moreover, with respect to the one or more methods or processes of the present disclosure shown or described herein, including but not limited to the flow charts shown in FIGS. 3 and 5, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, “can,” “could.” “might.” or “may,” unless specifically stated otherwise, or otherwise understood within the context as used, is generally intended to convey in a permissive manner that certain implementations could include, or have the potential to include, but do not mandate or require, certain features, elements and/or steps. In a similar manner, terms such as “include,” “including” and “includes” are generally intended to mean “including, but not limited to.” Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z." unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about." "approximately." "generally." "nearly" or "substantially" as used herein, represent a value, amount, or characteristic close to the stated value, amount, or characteristic that still performs a desired function or achieves a desired result. For example, the terms "about," "approximately," "generally." "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A system comprising:

a first computer system;

a vehicle comprising a second computer system; and a plurality of computer systems, wherein the first computer system is in communication with the second computer system and with each of the plurality of computer systems over one or more networks, wherein the first computer system is programmed with one or more sets of instructions that, when executed, cause the first computer system to execute a method comprising:

receiving, from the second computer system, a request by a local human operator of the vehicle to transfer operational control of the vehicle to a remote human operator, wherein the request is received at a first time;

determining information regarding at least one attribute of the local human operator, wherein the at least one attribute comprises a preference of the local human operator;

determining information regarding a drive state of the vehicle at the first time, wherein the information regarding the drive state comprises:

an identifier of a velocity or a speed of the vehicle at the first time;

an identifier of a location of the vehicle at the first time;

an identifier of a course or a direction of the vehicle at the first time;

an identifier of at least one Eulerian angle of the vehicle at the first time; or an identifier of a steering angle of the vehicle at the first time;

identifying a pool of remote human operators, wherein each one of the remote human operators is associated with one of the plurality of computer systems;

determining at least one attribute of at least some of the remote human operators, wherein the at least one attribute comprises:

an identifier of at least one driving skill of each one of the at least some of the remote human operators; or an identifier of a level of experience of each one of the at least some of the remote human operators in operationally controlling the vehicle, a class of vehicles including the vehicle, or at least one vehicle in at least one of a plurality of locations;

selecting one of the remote human operators based at least in part on;

the drive state of the vehicle at the first time;

a fit of the at least one driving skill of the selected one of the remote human operators for the preference of the local human operator; and a fit of the level of experience of the selected one of the remote human operators for the location of the vehicle at the first time or a location of the vehicle at a second time, wherein the second time follows the first time;

transferring operational control of the vehicle to the selected one of the remote human operators prior to the second time, wherein the selected one of the remote human operators is associated with a third computer system;

establishing a bi-directional communication channel between the third computer system and the second computer system over the one or more networks; and transmitting, from the third computer system to the second computer system, an instruction to change at least one of a course or a speed of the vehicle.

2. The system of claim 1, wherein the method further comprises:

determining that a condition forecast for the second time is inconsistent with the preference of the local human operator; and in response to determining that the condition forecast for the second time is inconsistent with the preference of the local human operator, transmitting at least a first message to the second computer system at a third time, wherein the third time is between the first time and the second time, wherein the first message represents a recommendation to transfer the operational control of the vehicle to one of the plurality of remote human operators, and wherein the request is received in response to at least the first message.

3. The system of claim 1, wherein the method further comprises:

determining, based at least in part on the information regarding the drive state of the vehicle, that the local human operator is violating one of a plurality of standards at the first time, wherein each one of the plurality of standards relates to at least one of:

a position of the vehicle at the first time;

a course of the vehicle at the first time;

a speed of the vehicle at the first time; or an operational restriction on the vehicle at the first time; and in response to determining that the local human operator is violating the one of the plurality of standards at the first time, transmitting at least a first message to the second computer system at a third time, wherein the first message represents a recommendation to transfer the operational control of the vehicle to one of the plurality of remote human operators, wherein the third time follows the first time, and wherein the request is received in response to at least the first message.

4. A method comprising:

receiving, from at least a first computer system provided aboard a first vehicle over one or more networks, first information regarding a first drive state of the first vehicle at a first time, wherein the first information is captured by at least a first sensor provided aboard the first vehicle, wherein the first information comprises a first location of the first vehicle at the first time, and wherein the first vehicle is under operational control of a local human operator at the first time;

identifying a driving profile of the local human operator, wherein the driving profile of the local human operator comprises at least one driving preference of the local human operator;

identifying, by the first computer system, driving profiles of a plurality of remote human operators, wherein each one of the driving profiles comprises:

a level of experience of one of the plurality of remote human operators in at least one location; and at least one driving tendency of the one of the plurality of remote human operators;

selecting, by the first computer system, a first remote human operator of the plurality of remote human operators based at least in part on:

the first drive state of the first vehicle at the first time;

a first level of experience of the first remote human operator in the first location; and a similarity of at least a first driving tendency of the first remote human operator to the at least one driving preference of the local human operator;

establishing a bi-directional communication channel between the first computer system and a second computer system over the one or more networks, wherein the second computer system is associated with the first remote human operator; and transferring operational control of the first vehicle to the second computer system at a second time, wherein the second time follows the first time.

5. The method of claim 4, further comprising:

receiving, from the first computer system over the one or more networks, an instruction to transfer the operational control of the first vehicle to the local human operator of the first vehicle; and in response to the instruction, transferring the operational control of the first vehicle to the local human operator at a third time, wherein the third time follows the second time; and disestablishing the bi-directional communication channel between the first computer system and the second computer system.

6. The method of claim 5, further comprising:

determining, by the second computer system, that a condition forecast for a fourth time is inconsistent with the first level of experience or the first driving tendency, wherein the fourth time follows the second time; and in response to determining that the condition forecast for the fourth time is inconsistent with the first level of experience or the first driving tendency, transmitting at least a first message to the first computer system, wherein the first message represents a recommendation to transfer the operational control of the first vehicle to the local human operator of the first vehicle, wherein the instruction is received following the recommendation.

7. The method of claim 5, further comprising:

determining, by the second computer system, that connectivity between the first computer system and the second computer system via the bi-directional communication channel is challenged at a fourth time, wherein the fourth time precedes the third time and follows the second time; and in response to determining that the connectivity between the first and the second is challenged at the fourth time, transmitting at least a first message to the first computer system, wherein the first message represents a recommendation to transfer the operational control of the first vehicle to the local human operator of the first vehicle, wherein the instruction is received following the recommendation.

8. The method of claim 4, further comprising:

receiving, from the first computer system over the one or more networks, a request to transfer the operational control of the first vehicle to a remote human operator at a third time, wherein the third time precedes the first time, and wherein the driving profiles of the plurality of remote human operators is identified in response to the request.

9. The method of claim 4, wherein each one of the driving profiles of the plurality of remote human operators further comprises:

at least one driving skill;

a level of experience in operationally controlling the first vehicle;

a level of experience in operationally controlling a second vehicle, wherein the second vehicle is in a class of vehicles including the first vehicle; or a level of experience in operationally controlling at least one vehicle within a vicinity of the first location.

10. The method of claim 4, further comprising:

transmitting at least a first message to the first computer system at a third time over the one or more networks, wherein the third time precedes the second time, and wherein the first message represents a recommendation to transfer the operational control of the first vehicle to one of the plurality of remote human operators; and receiving at least a second message from the first computer system at a fourth time over the one or more networks, wherein the fourth time follows the third time, wherein the second message represents an instruction to transfer the operational control of the first vehicle to one of the plurality of remote human operators, and wherein the first remote human operator is selected in response to the instruction.

11. The method of claim 10, further comprising:

predicting, based at least in part on the first information, that the local human operator is at risk of violating one of a plurality of standards at the first time, wherein each one of the plurality of standards relates to at least one of:

a position of the first vehicle at the first time;

a course of the first vehicle at the first time;

a speed of the first vehicle at the first time; or an operational restriction on the first vehicle at the first time, and wherein at least the first message is transmitted to the first computer system at the third time over the one or more networks in response to determining that the local human operator is at risk of violating the one of the plurality of standards at the first time.

12. The method of claim 4, further comprising:

receiving, from the first computer system over the one or more networks, second information regarding a second drive state of the first vehicle at a third time, wherein the second information is captured by at least the first sensor, wherein the second information comprises a second location of the first vehicle at the third time, wherein the first vehicle is under operational control of the first remote human operator at the third time, and wherein the third time follows the second time;

determining, based at least in part on the second information, that the first remote human operator is violating one of a plurality of standards at the third time, wherein each one of the plurality of standards relates to at least one of:

a position of the first vehicle at the third time;

a course of the first vehicle at the third time;

a speed of the first vehicle at the third time; or an operational restriction on the first vehicle at the third time;

selecting a second remote human operator of the plurality of remote human operators based at least in part on:

the second drive state of the first vehicle at the third time;

a second level of experience of the second remote human operator in the second location; and a similarity of a second driving profile of the second remote human operator to at least the driving profile of the local human operator;

establishing a bi-directional communication channel between the first computer system and a third computer system over the one or more networks, wherein the third computer system is associated with the second remote human operator; and transferring operational control of the first vehicle to the third computer system at a fourth time, wherein the fourth time follows the third time; and disestablishing the bi-directional communication channel between the first computer system and the second computer system.

13. The method of claim 4, further comprising:

receiving, from the first computer system over the one or more networks, a request to transfer operational control of the first vehicle to a remote human operator other than the first remote human operator at a third time, wherein the first vehicle is under operational control of the first remote human operator at the third time, and wherein the third time follows the second time;

determining, by the first computer system, second information regarding a second drive state of the first vehicle at the third time, wherein the second information is captured by at least the first sensor, and wherein the second information comprises a second location of the first vehicle at the third time;

selecting a second remote human operator of the plurality of remote human operators based at least in part on:

the second drive state of the first vehicle at the third time;

a second level of experience of the second remote human operator in the second location; and a similarity of at least a second driving tendency of the second remote human operator to the at least one driving preference of the local human operator;

establishing a bi-directional communication channel between the first computer system and a third computer system over the one or more networks, wherein the third computer system is associated with the second remote human operator; and transferring operational control of the first vehicle to the third computer system at a fourth time, wherein the fourth time follows the third time; and disestablishing the bi-directional communication channel between the first computer system and the second computer system.

14. The method of claim 4, wherein the first vehicle is one of a convertible, a coupe, a hatch back, a sedan, a sport-utility vehicle, a truck, or a van, and wherein the first vehicle comprises:

an engine;

a drive train having a transmission having at least one driveshaft, at least one axle, and at least one wheel;

a frame; and a first plurality of actuators, wherein the first plurality of actuators comprises:

a steering wheel;

an accelerator pedal; and a brake pedal; and wherein each of the first plurality of actuators is configured for local human operation or remote operation in response to one or more signals received by the first computer system.

15. The method of claim 14, wherein the second computer system comprises a second plurality of actuators, wherein the second plurality of actuators comprises:

a steering wheel;

an accelerator pedal; and a brake pedal, wherein the second computer system is configured to transmit one or more signals to the first computer system in response to operation of one or more of the second plurality of actuators by a remote human operator.

16. The method of claim 14, wherein the first sensor is an imaging device, wherein the first vehicle further comprises a second sensor, wherein the second sensor comprises at least one of:

a speedometer;

an encoder;

an accelerometer;

a pressure sensor; or an orientation sensor; and wherein the first information is captured by the first sensor and the second sensor.

17. A vehicle comprising:

a frame;

an engine;

a drive train comprising a transmission, a drive shaft, at least one axle and at least one wheel;

at least one door for accessing a space within the frame;

at least one sensor;

a first computer system in communication with at least a second computer system over one or more networks; and a first plurality of actuators in communication with the first computer system, wherein the first plurality of actuators comprises a steering wheel, an accelerator pedal and a brake pedal, and wherein each of the first plurality of actuators is configured for local human operation or remote operation in response to one or more instructions received by the first computer system, wherein the first computer system is configured to execute a method comprising:

receiving an instruction from a local human operator of the vehicle to transfer operational control of the vehicle to a remote human operator;

capturing information regarding a first drive state of the vehicle at a first time by the at least one sensor, wherein the information regarding the first drive state comprises an identifier of a location of the vehicle at the first time and at least one of:

an identifier of a speed of the vehicle; or an identifier of a steering angle of the vehicle;

transmitting at least some of the information regarding the first drive state to a second computer system, wherein the second computer system comprises at least one data store, and wherein the at least one data store includes:

information regarding a preference of the local human operator; and information regarding a plurality of remote human operators;

establishing a bi-directional communication channel with at least a third computer system associated with a remote human operator selected by the second computer system based at least in part on;

the first drive state;

a level of experience of the remote human operator in the location; and a similarity between the preference of the local human operator and at least one driving tendency of the remote human operator, wherein the third computer system is in communication with a second plurality of actuators, and wherein each of the second plurality of actuators is configured to generate one or more instructions for remote operation of the vehicle;

receiving an instruction from the third computer system, wherein the instruction identifies at least one of a change in the speed of the vehicle or a change in the steering angle of the vehicle; and executing the instruction to cause the at least one of the change in speed of the vehicle or the change in the steering angle of the vehicle by at least one of the first plurality of actuators.

18. The vehicle of claim 17, wherein the method further comprises:

receiving, from the second computer system, a recommendation to transfer the operational control of the vehicle to the local human operator of the vehicle, receiving an instruction from the local human operator to transfer the operational control of the vehicle to the local human operator of the vehicle, wherein the instruction is received following the recommendation; and in response to the instruction, disestablishing the bi-directional communication channel between the first computer system and the third computer system.

19. The vehicle of claim 17, wherein the at least one sensor is one of:

a camera;

a speedometer;

an encoder;

an accelerometer;

a pressure sensor; or an orientation sensor.

20. The vehicle of claim 17, wherein the vehicle is one of a convertible, a coupe, a hatch back, a sedan, a sport-utility vehicle, a truck, or a van.

* * * * *